US010264740B2

(12) United States Patent
Mortensen et al.

(10) Patent No.: US 10,264,740 B2
(45) Date of Patent: Apr. 23, 2019

(54) IRRIGATING SOILS AND CROPS

(71) Applicant: Pivot Pup Irrigation, LLC, Burley, ID (US)

(72) Inventors: Bruce C. Mortensen, Burley, ID (US); Norman Delton Hansen, Burley, ID (US); Ivan Hugh McCracken, II, Burley, ID (US)

(73) Assignee: Pivot Pup Irrigation, LLC, Burley, ID (US)

( * ) Notice: Subject to any disclaimer, the term of this patent is extended or adjusted under 35 U.S.C. 154(b) by 49 days.

(21) Appl. No.: 14/960,325

(22) Filed: Dec. 4, 2015

(65) Prior Publication Data

US 2016/0157445 A1     Jun. 9, 2016

Related U.S. Application Data

(60) Provisional application No. 62/088,412, filed on Dec. 5, 2014.

(51) Int. Cl.
    *B05B 1/20*         (2006.01)
    *A01G 25/09*      (2006.01)
    *B05B 13/00*      (2006.01)

(52) U.S. Cl.
    CPC .............. *A01G 25/092* (2013.01); *B05B 1/20* (2013.01); *B05B 13/005* (2013.01)

(58) Field of Classification Search
    CPC ........ A01G 25/092; B05B 1/20; B05B 13/005
    USPC ......................................................... 239/728
    See application file for complete search history.

(56) References Cited

U.S. PATENT DOCUMENTS

| | | | |
|---|---|---|---|
| 2,796,292 | A | 6/1957 | Maggart |
| 2,801,132 | A | 7/1957 | Shuck |
| 3,101,903 | A | 8/1963 | Hall |
| 3,140,827 | A | 7/1964 | Fletcher |
| 3,314,608 | A | 4/1967 | Curtis |
| 3,493,176 | A | 2/1970 | Kinkead |
| 3,545,678 | A | 12/1970 | Tangeman |
| 3,583,639 | A | 6/1971 | Cornelius |
| 3,589,604 | A | 6/1971 | Paul |

(Continued)

FOREIGN PATENT DOCUMENTS

| | | | | | |
|---|---|---|---|---|---|
| AU | B-44840/93 | * | 8/1992 | ............ | A01M 11/00 |
| CA | 2683845 A1 | | 6/2010 | | |
| CA | 2683845 C | | 6/2010 | | |

OTHER PUBLICATIONS

Farm Show, How to Stop Center Pivot Ruts Before They Start (accessed Mar. 1, 2016), Farm Show Magazine, https://www.farmshow.com/a_article.php?aid=26828, see attachment for details.

(Continued)

*Primary Examiner* — Chee-Chong Lee
(74) *Attorney, Agent, or Firm* — Flaig Law Office, PLLC; Jason E. Flaig

(57) ABSTRACT

Systems, methods and apparatuses for irrigating soils and crops are described. The irrigation system may include a center pivot irrigation system and at least one irrigation apparatus. The irrigation apparatus may include at least one side frame, at least one back frame, at least one boom assembly, at least one means for enabling the apparatus to move, and/or at least one means for configuring the apparatus to the center pivot irrigation system. The disclosure may reduce and/or eliminate rut formation.

20 Claims, 15 Drawing Sheets

(56) References Cited

U.S. PATENT DOCUMENTS

| | | | |
|---|---|---|---|
| 3,610,531 A | 10/1971 | Erickson | |
| 3,669,355 A | 6/1972 | Jurgens | |
| 3,771,720 A | 1/1973 | Courtright | |
| 3,882,885 A | 5/1975 | McCain | |
| 3,902,668 A | 9/1975 | Daugherty | |
| 3,942,722 A | 3/1976 | Ede | |
| 3,999,569 A | 12/1976 | Lindner | |
| 4,059,911 A | 11/1977 | Bean et al. | |
| 4,192,388 A | 3/1980 | Goebel | |
| 4,209,068 A | 6/1980 | Corsentino | |
| 4,262,752 A | 4/1981 | Parish | |
| 4,363,444 A | 12/1982 | Dejoie | |
| 4,365,748 A | 12/1982 | Emrich | |
| 4,452,394 A | 6/1984 | Emrich | |
| 4,569,481 A * | 2/1986 | Davis | A01G 25/092 239/729 |
| 4,601,347 A | 7/1986 | Parish | |
| 4,664,316 A * | 5/1987 | Purtell | A01G 25/09 137/899.1 |
| 4,674,681 A * | 6/1987 | Meis | A01G 25/092 239/1 |
| 4,729,514 A * | 3/1988 | Ostrom | A01C 7/004 111/130 |
| 4,735,365 A | 4/1988 | Smeller et al. | |
| 4,909,334 A | 3/1990 | Tanner et al. | |
| 4,949,656 A | 8/1990 | Lyle et al. | |
| 5,078,326 A | 1/1992 | Wright | |
| 5,226,690 A | 7/1993 | Clark et al. | |
| 5,341,995 A | 8/1994 | Leatch | |
| 5,380,075 A | 1/1995 | Haws | |
| 5,435,495 A * | 7/1995 | Davis | A01G 25/092 239/726 |
| 5,447,274 A | 9/1995 | Tofin et al. | |
| 5,451,001 A | 9/1995 | Kumm | |
| 5,505,386 A | 4/1996 | Stone | |
| 5,678,771 A * | 10/1997 | Chapman | A01G 25/092 239/727 |
| 5,810,452 A | 9/1998 | Hawthorne et al. | |
| 6,007,004 A | 12/1999 | Unruh | |
| 6,116,527 A | 9/2000 | Granger et al. | |
| 6,131,833 A | 10/2000 | Chapman | |
| 6,386,792 B1 | 5/2002 | Stevenson | |
| 6,427,781 B1 | 8/2002 | Buhler | |
| 6,616,374 B2 | 9/2003 | Starr | |
| 6,805,311 B2 | 10/2004 | Buller | |
| 7,094,443 B2 | 8/2006 | Loucks | |
| 7,546,963 B2 | 6/2009 | Sieling | |
| 7,669,784 B2 | 3/2010 | Sobolik | |
| 7,775,610 B2 | 8/2010 | Mettenbrink | |
| 7,866,580 B2 | 1/2011 | Arthur et al. | |
| 7,946,658 B2 | 5/2011 | Lanser | |
| 8,317,114 B1 | 12/2012 | Malsam | |
| 8,550,383 B2 | 10/2013 | McConnell | |
| 8,702,014 B1 | 4/2014 | Bullard, III | |
| 8,757,301 B2 | 6/2014 | Korus et al. | |
| 2002/0119008 A1 | 8/2002 | Starr | |
| 2004/0074990 A1 | 4/2004 | Loucks | |
| 2004/0093912 A1* | 5/2004 | Krieger | A01G 25/092 68/12.26 |
| 2006/0060665 A1 | 3/2006 | Arthur et al. | |
| 2007/0215719 A1 | 9/2007 | Sobolik | |
| 2010/0148570 A1 | 6/2010 | Lanser | |
| 2011/0121090 A1 | 5/2011 | Price | |
| 2011/0220743 A1 | 9/2011 | Arthur et al. | |
| 2012/0228864 A1 | 9/2012 | Kerns | |
| 2012/0241531 A1 | 9/2012 | Werner | |
| 2013/0041537 A1* | 2/2013 | Malsam | A01G 25/095 701/22 |

OTHER PUBLICATIONS

Farm Show, How to Stop Center Pivot Ruts Before They Start (accessed Nov. 3, 2014), other details unknown or otherwise indicated on attachment.

A.M. Leonard, Kings 4 Wheel 100 gal Trailer Sprayers, http://www.amleo.com/kings-4-wheel-100-gal-trailer-sprayers/p/VP-K4C1XX/ (accessed Mar. 1, 2016), see attachment for details.

Wikipedia, List of agricultural machinery, https://en.wikipedia.org/wiki/List_of_agricultural_machinery, other details unknown or otherwise indicated on attachment.

A.M. Leonard, http://www.amleo.com/kings-4-wheel-trailer-sprayer-100gal-with-4-roller-pump-up-to-150psi-and-5hp-honda-engine/pK4C1P5/ (acd Mar. 1, 2016), see attachment for details.

Bigiron Auctions, Sprayers (accessed Mar. 1, 2016), http://www.bigiron.com/cgi-bin/mnarclist.cgi?bigiron/20140305/category/SPRAYERS (accessed Mar. 11, 2016), see attachment for details.

Giampi, Irrigation Boom F.V.T. Dec. 2018 (accessed Mar. 1, 2016), http://www.giampi.com/eng/ala_piovana_fvt_12-18.php (accessed Mar. 16, 2016), see attachment for details.

Giampi, Irrigation Boom F.V.T. Dec. 18 (accessed Mar. 1, 2016), other details unknown or otherwise indicated on attachment.

Giampi, Irrigation Boom F.V.T. 25/32 (accessed Mar. 1, 2016), http://www.giampi.com/eng/ala_piovana_fvt_25_32.php, other details unknown or otherwise indicated on attachment.

Giampi, Irrigation Boom F.V.T. 25/32 (accessed Mar. 1, 2016), other details unknown or otherwise indicated on attachment.

Cheffins, Lot 4318—Briggs R50 Irrigation Boom 48m (accessed Mar. 3, 2016), http://www.cheffins.co.uk/lot/briggs-r50-irrigation-boom-48m-498576-machinery-1, see attach. for details.

High Tech, Briggs Booms (accessed Mar. 3, 2016), http://www.htequipment.net/Briggs.asp (accessed Mar. 3, 2016), other details unknown or otherwise indicated on attachment.

Newsholme Engineering Ltd, Welcome to Newsholme Engineeering (accessed Mar. 3, 2016), http://www.irrigation-uk.com/ (accessed Mar. 3, 2016), see attachment for details.

BITS4FARMS, Irrigation and Drainage (accessed Mar. 3, 2016), http://www.bits4farms.co.nz/products/irrigation-and-drainage/?p=9 (accessed Mar. 3, 2016), see attachment for details.

Hellotrade, Rainspan Boom Irrigator (accessed Mar. 3, 2016), http://www.hellotrade.com/rodney-industries/rainspan-boom-irrigator.html (accessed Mar. 3, 2016), see attachment for details.

Giampi, Wing-Supporting Truck (accessed Mar. 3, 2016), http://www.giampi.com/eng/carrelli_porta_ala.php (accessed Mar. 3, 2016), other details unknown or otherwise indicated on attachment.

Giampi, Accessories F.V.T. 25/32 (accessed Mar. 3, 2016), other details unknown or otherwise indicated on attachment.

Giampi, Folding Irrigation Boom (accessed Mar. 3, 2016), http://www.giampi.com/eng/ala_piovana_pieghevole.php (accessed Mar. 3, 2016), see attachment.

Giampi, Irrigation Boom A.V.T.—F.V.T 91 (accessed Mar. 3, 2016), http://www.giampi.com/eng/ala_piovana_avt_fvt_91.php (accessed Mar. 3, 2016), see attachment for details.

Giampi, Trolley for Diches (accessed Mar. 3, 2016), http://www.giampi.com/eng/carrello_per_fossi.php (accessed Mar. 3, 2016), other details unknown or otherwise indicated on attachment.

Ellis Irrigation, Booms (accessed Mar. 3, 2016), http://www.ellisirrigation.co.uk/products/booms/ (accessed Mar. 3, 2016), other details unknown or otherwise indicated on attachment.

Living Heritage, Roto-rainer (accessed Mar. 3, 2016), http://www.livingheritage.org.nz/schools/primary/duntroon/irrigation/roto-rainer.php (accessed Mar. 3, 2016), see attach. for details.

Kelly Tractor, ABI Irrigation Equipment (accessed Mar. 3, 2016), http://www.kellytractor.com/eng/products/agriculture/ABI/ (accessed Mar. 3, 2016), see attachment for details.

Briggs Irrigation, Four Wheel Chassis Boom (accessed Mar. 3, 2016), http://www.briggsirrigation.co.uk/products/four-wheel-chassis-boom/ (accessed Mar. 3, 2016), see attachment for details.

Upton Irrigation, Upton Self-Propelled Travelling Boom Irrigators (accessed Mar. 3, 2016), http://www.agrequiments.com.au/upton/ (accessed Mar. 3, 2016), see attachment for details.

* cited by examiner

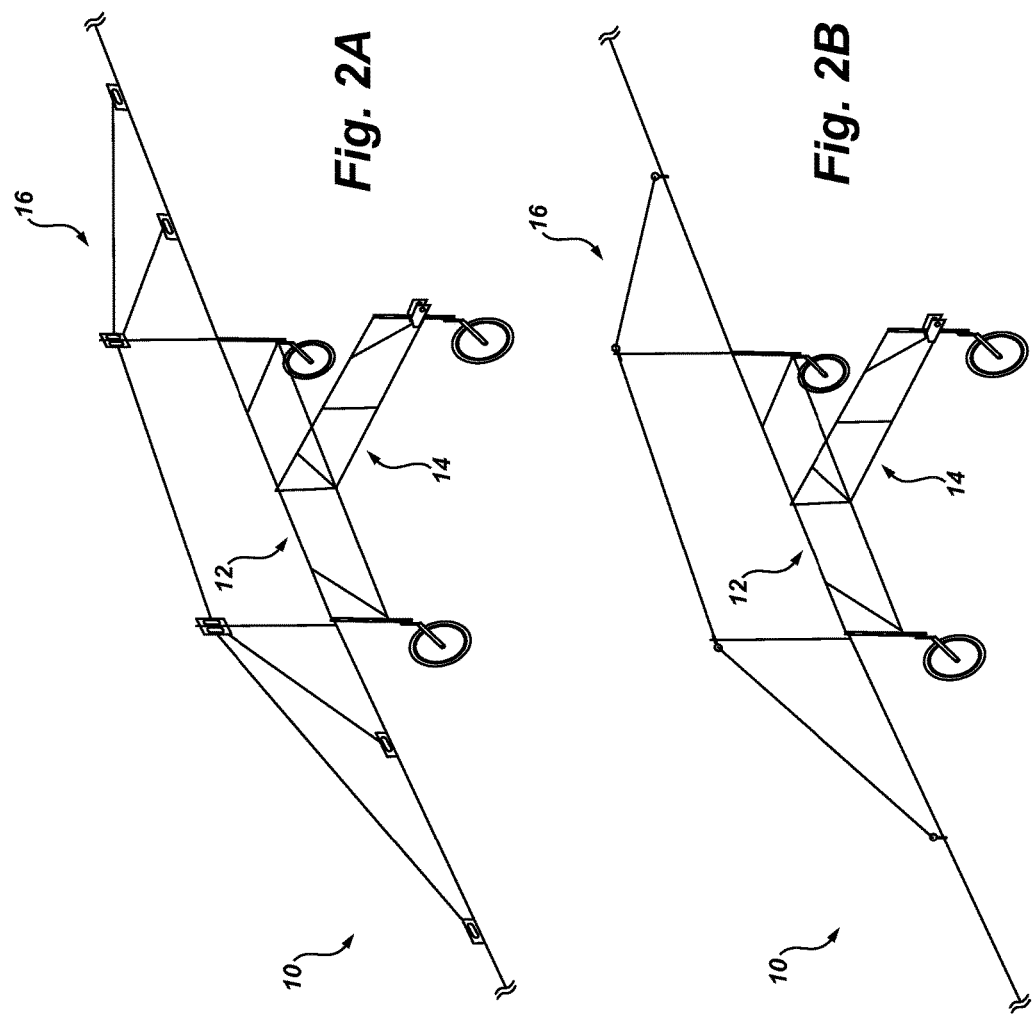

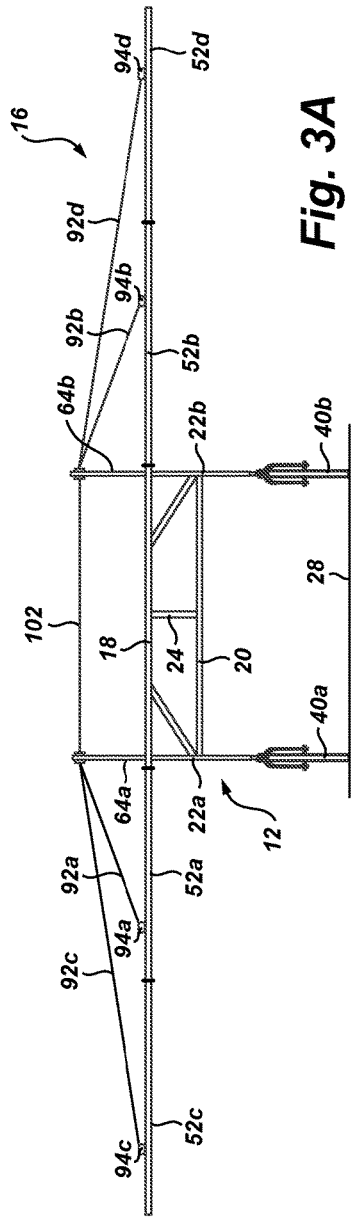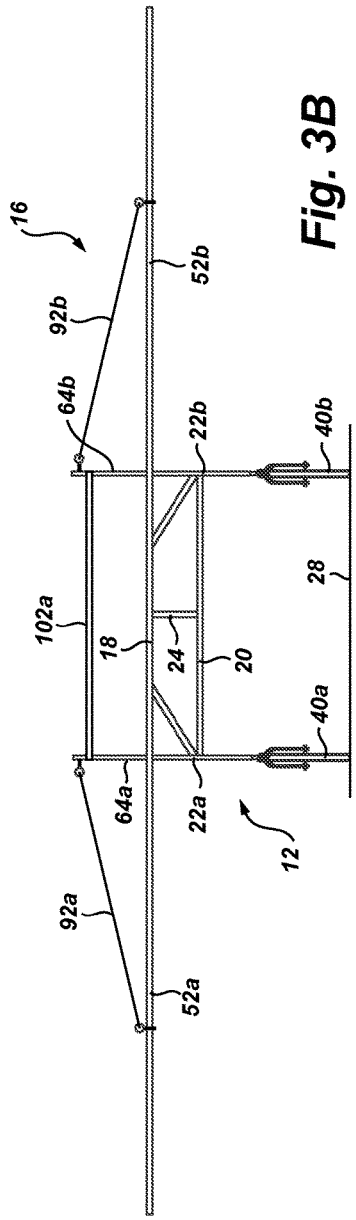

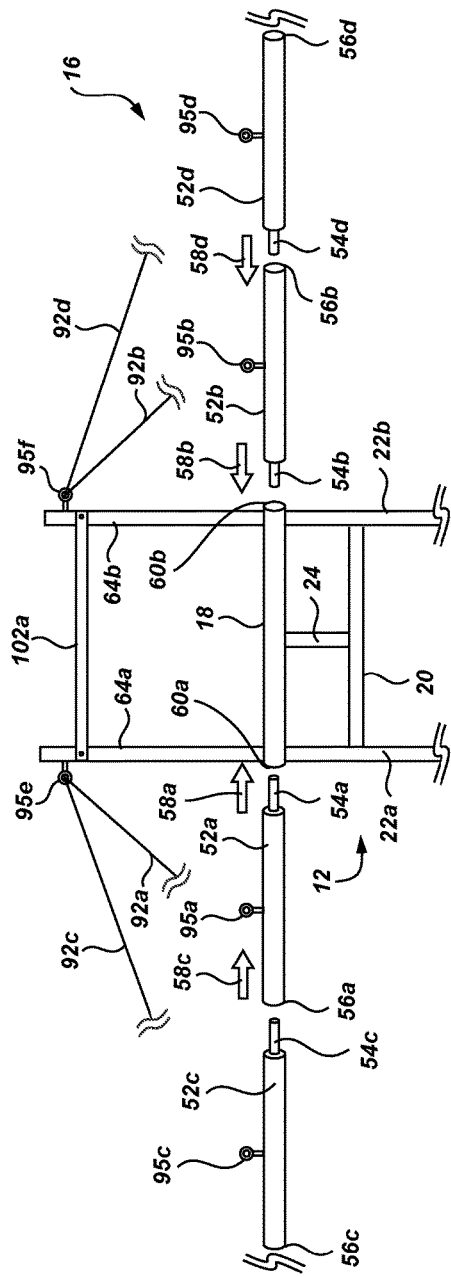
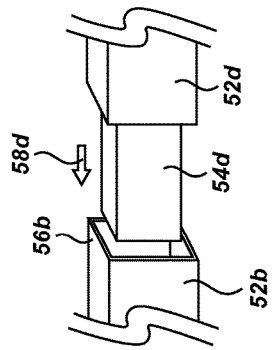
Fig. 7
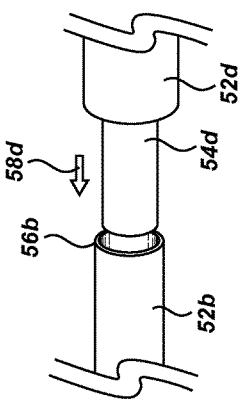
Fig. 8
Fig. 6

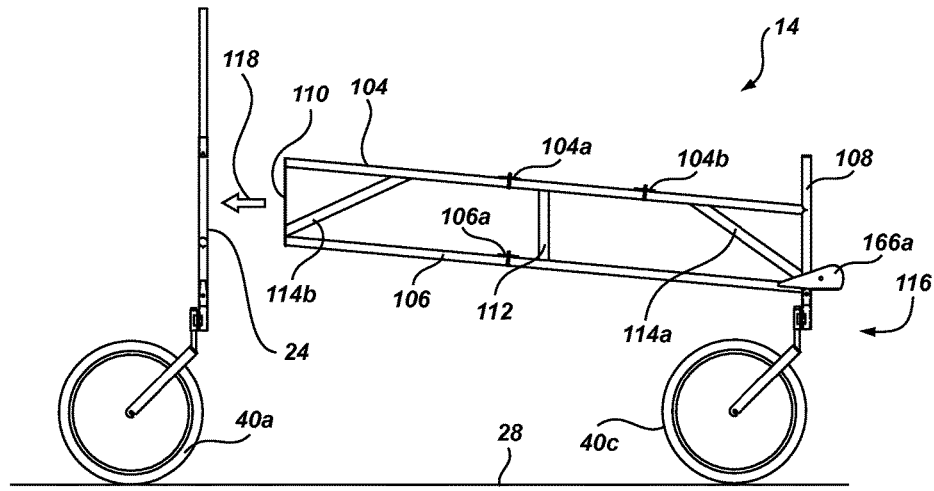
Fig. 10
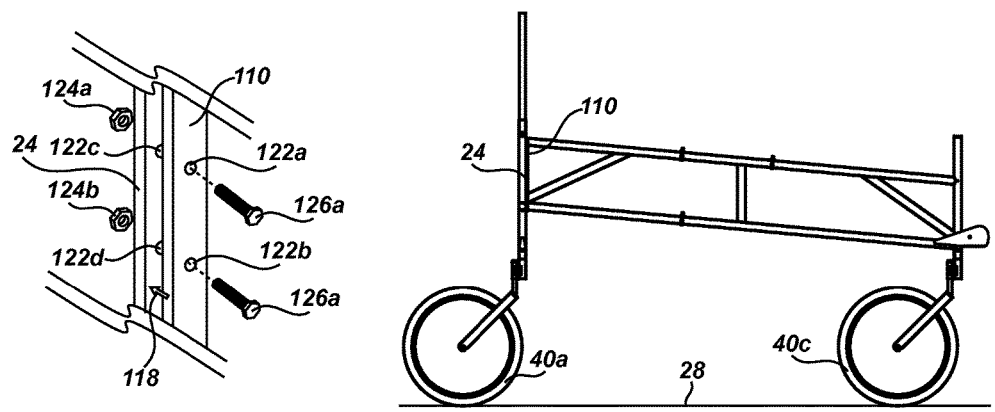
Fig. 11  Fig. 12

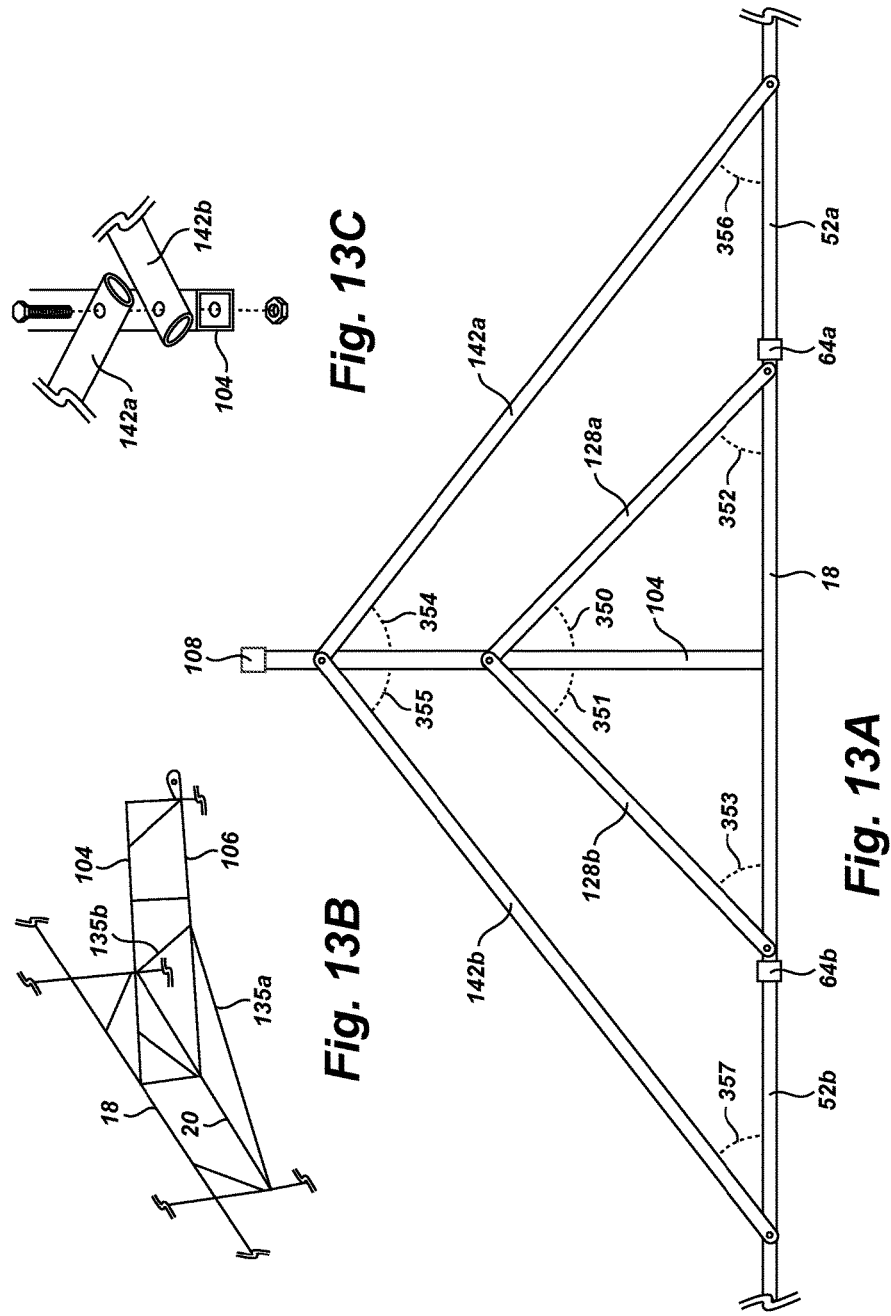

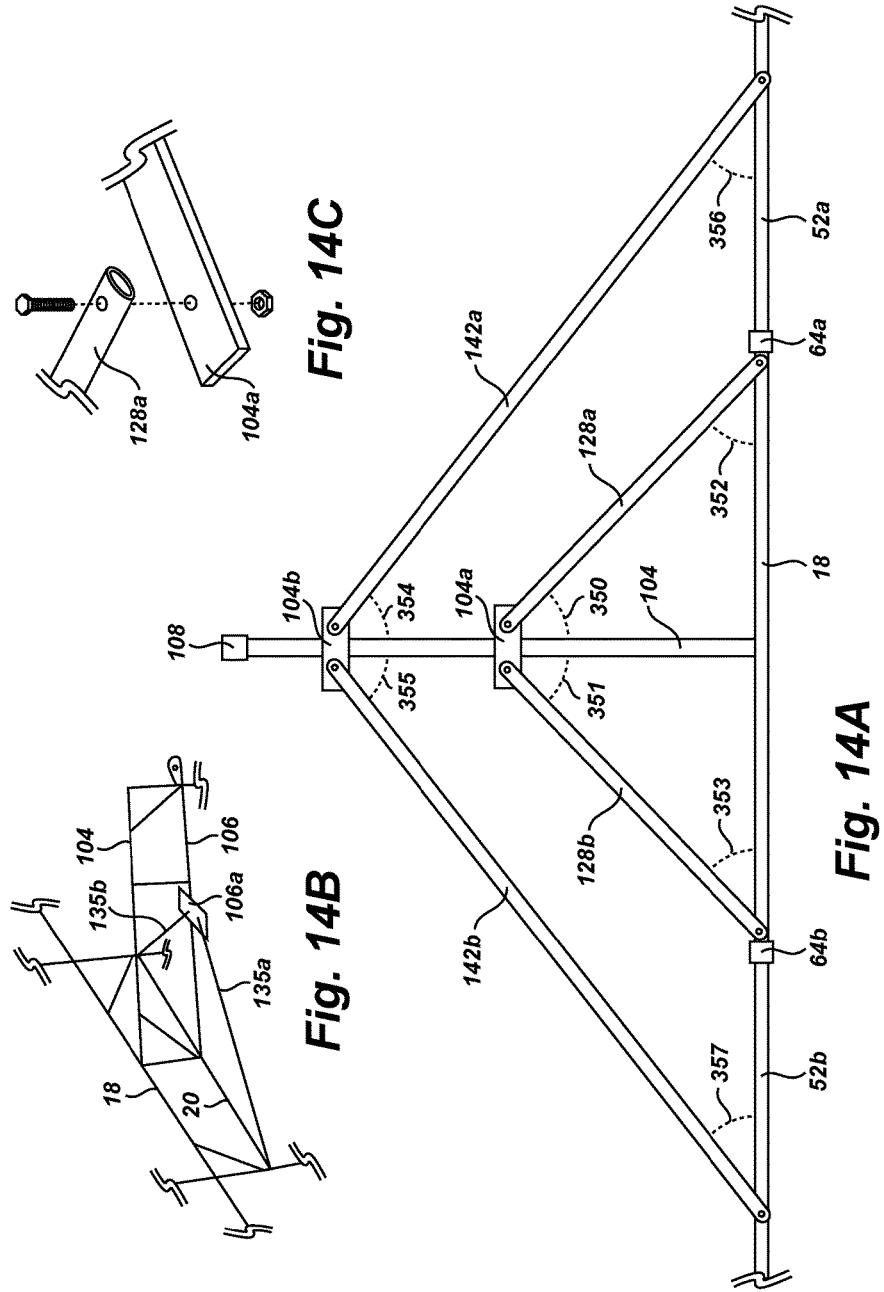

IRRIGATING SOILS AND CROPS

CROSS-REFERENCES TO RELATED APPLICATION

This application claims the benefit of and priority to: prior U.S. Provisional Application No. 62/088,412, filed on Dec. 05, 2014, which is entitled "IRRIGATING SOIL AND/OR CROPS".

The entire content of the above document is hereby incorporated herein by reference as part of this application.

BACKGROUND

Technical Field

The disclosure relates at least to irrigating soils and crops.

Discussion of Related Field

Soil and crops may be irrigated by using various systems, methods, devices, apparatuses, materials, and/or other things. Center pivot irrigation systems, otherwise known as center pivots, are commonly used to irrigate soil and crops. Center pivot irrigation systems may include, among other things, a pump, a center pivot, a suspended pipeline and at least one support tower which moves the pipeline around the pivot.

Ruts, otherwise known as depressions, slurry build-up, and/or deepened tracks, may occur, at least in part, when soil is watered in relatively close proximity to support towers which travel over the wet soil. The problem may worsen and ruts may deepen if an irrigation system completes successive cycles wherein the support towers repeatedly travel over wet soil. Ruts may cause serious problems, including but not limited to, mechanical damage, breakdowns and/or misalignments, delays, crop damage, lost revenue due to the lack of harvestable crops, increased labor and/or equipment costs, irrigation disruptions, etc.

Efforts have been made to reduce rut formation; however, there may be a need for improved devices, methods and systems for reducing and/or illuminating the formation of ruts.

SUMMARY

In one aspect an irrigation apparatus may include: at least one side frame; at least one back frame; at least one boom assembly; at least one means for enabling the apparatus to move; at least one means for configuring the apparatus to a center pivot irrigation system; at least one means for receiving water from the center pivot irrigation system; at least one means for distributing the water received from the center pivot irrigation system onto crops; and/or at least one means for enabling the center pivot irrigation system to move the apparatus.

Implementations may include one or more of the following features. An irrigation apparatus wherein the at least one side frame may include at least one top side member. An irrigation apparatus wherein the at least one side frame may include at least one bottom side member. An irrigation apparatus wherein the at least one side frame may include at least one front leg member. An irrigation apparatus wherein the at least one back frame may include at least one top back member. An irrigation apparatus wherein the at least one back frame may include at least one bottom back member. An irrigation apparatus wherein the at least one back frame may include at least one back leg member. An irrigation apparatus may include at least one means for releaseably configuring at least one aspect of side frame to at least one aspect of back frame. An irrigation apparatus wherein the at least one boom assembly may include at least two boom arms. An irrigation apparatus wherein the at least one boom assembly may include at least one vertical post assembly. An irrigation apparatus may include at least one means for releaseably configuring at least one aspect of boom assembly to at least one aspect of back frame. An irrigation apparatus may include at least one means for stabilizing at least one aspect of the apparatus. An irrigation apparatus wherein the at least one means for stabilizing at least one aspect of the apparatus may include at least one strut. An irrigation apparatus wherein the at least one means for enabling the apparatus to move may include at least two mobility assemblies each comprising at least one wheel. An irrigation apparatus wherein the at least one means for configuring the apparatus to a center pivot irrigation system may include: at least one receiver assembly; at least one tongue assembly; and at least one tow assembly. An irrigation apparatus wherein the at least one means for receiving water from the center pivot irrigation system may include at least one water line. An irrigation apparatus wherein the at least one means for receiving water from the center pivot irrigation system may include: at least one intake line; at least one pivot manifold; and at least one water line. An irrigation apparatus wherein the at least one means for distributing the water received from the center pivot irrigation system onto crops may include at least one apparatus sprinkler assembly. An irrigation apparatus wherein the at least one means for enabling the center pivot irrigation system to move the apparatus may include at least one tow assembly.

In another aspect an irrigation system may include: a center pivot irrigation system; and at least one irrigation apparatus which may include at least one side frame; at least one back frame; at least one boom assembly; at least one means for enabling the apparatus to move; at least one means for configuring the apparatus to the center pivot irrigation system; at least one means for receiving water from the center pivot irrigation system; at least one means for distributing the water received from the center pivot irrigation system onto crops; and/or at least one means for enabling the center pivot irrigation system to move the apparatus.

These general and specific aspects may be implemented by using systems, apparatuses, devices, means, methods and structures or any combination thereof.

Certain implementations may provide one or more of the following advantages. Embodiments may not achieve any or all of the listed advantages. Further, this is not an exhaustive list of all possible advantages of the disclosure. One or more embodiments of the disclosure may be configured to be and/or provide users the following.

In one or more embodiments, the disclosure may reduce and/or illuminate the formation of ruts; provide for at least one irrigation apparatus to be pulled/towed and/or pushed by a center pivot irrigation system; provide for at least one irrigation apparatus be to receive water from a center pivot irrigation system and channel the water received to at least one sprinkler assembly for distribution onto soils and crops; reroute and spray water sufficiently far enough behind at least one support tower of a center pivot irrigation system so that at least one support tower does not travel over wet ground and/or as wet as the ground would be without the disclosure; maintain the same, substantially similar, different and/or better crop coefficients, spray patterns, watering rates, and/or watering quantity compared to what was achievable by the center pivot irrigation system without the disclosure.

Other features and advantages may be apparent from the following detailed description, the accompanying drawings, and the claims.

BRIEF DESCRIPTION OF THE DRAWINGS

Various embodiments of the disclosure will now be discussed with reference to the appended drawings. It is appreciated that these drawings depict only typical embodiments of the disclosure and are not to be considered limiting of its scope.

FIG. 2A shows a perspective view of one embodiment of aspects of an irrigation apparatus including aspects of at least one back frame, aspects of at least one side frame and/or aspects of at least one boom assembly;

FIG. 2B shows a perspective view of another embodiment of aspects of an irrigation apparatus including aspects of at least one back frame, aspects of at least one side frame and/or aspects of at least one boom assembly;

FIG. 3A shows a rear view of one embodiment of aspects of at least one back frame and aspects of at least one boom assembly;

FIG. 3B shows a rear view of another embodiment of aspects of at least one back frame and aspects of at least one boom assembly;

FIG. 6 shows one embodiment of aspects of at least one back frame and aspects of at least one boom assembly;

FIG. 7 shows an exploded view of one embodiment of aspects of boom arms;

FIG. 8 shows an exploded view of another embodiment of aspects of boom arms;

FIG. 10 shows one embodiment of aspects of at least one side frame and aspects of at least one back frame;

FIG. 11 shows one embodiment of aspects of how at least one side frame may be configured to at least one back frame;

FIG. 12 shows one embodiment of at least one side frame being configured to at least one back frame;

FIG. 13A shows a top view of one embodiment of aspects of various struts and aspects of an irrigation apparatus;

FIG. 13B shows a perspective view of one embodiment of aspects of various struts and other aspects of an irrigation apparatus;

FIG. 13C shows one embodiment of how two struts may be releaseably configured to each other and/or to other aspects of an irrigation apparatus;

FIG. 14A shows a top view of one embodiment of aspects of various struts which may be configured to aspects of an irrigation apparatus by means of flat bars;

FIG. 14B shows a perspective view of one embodiment of aspects of various struts which may be configured to aspects of an irrigation apparatus by means of a flat bar;

FIG. 14C show one embodiment of how a strut may be configured to a flat bar;

DETAILED DESCRIPTION

Figure 1:
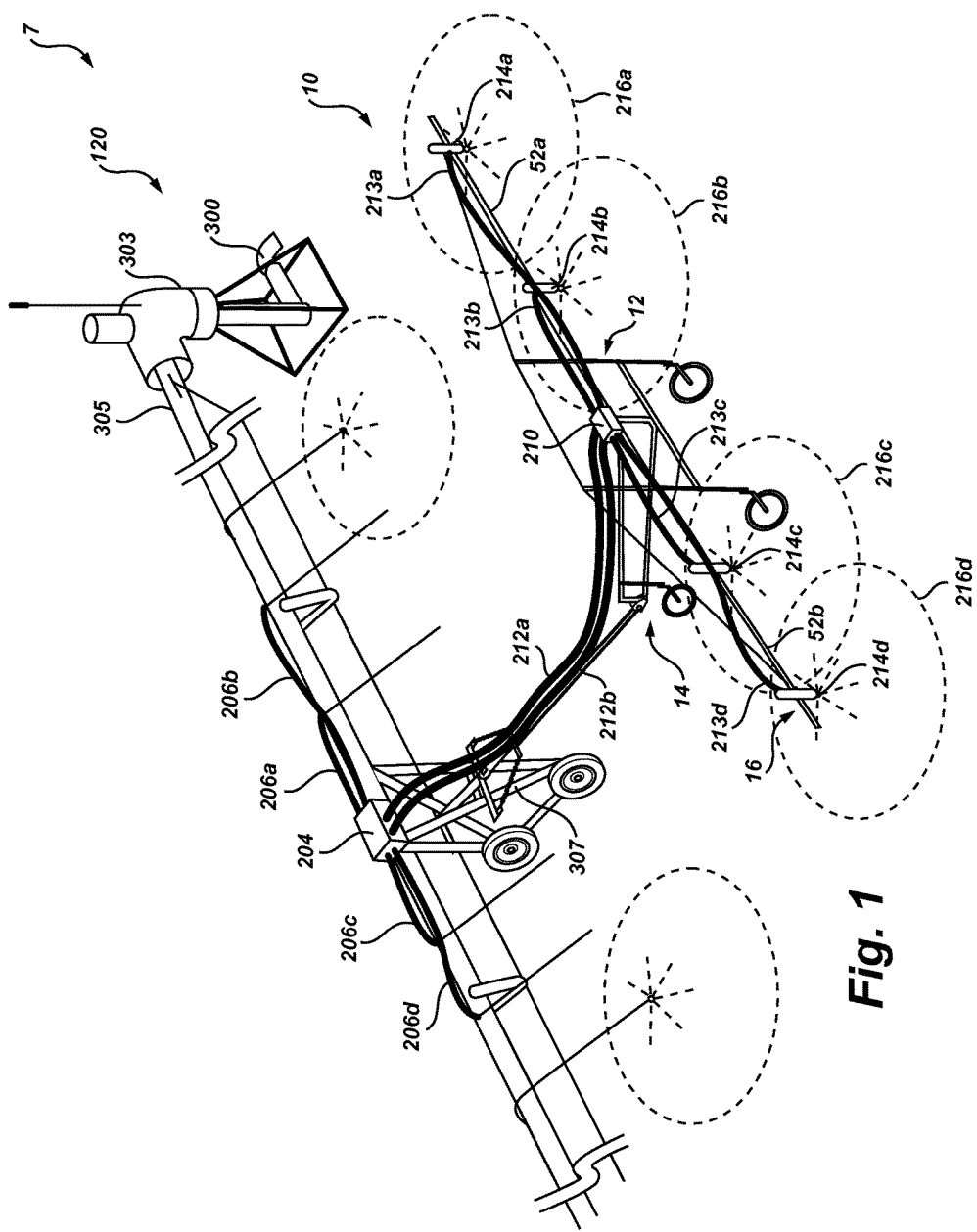
FIG. 1 shows a perspective view of one embodiment of aspects of an irrigation system which may include a center pivot irrigation system and at least one irrigation apparatus.

The following description illustrates principles of the disclosure which may be applied in various ways to provide different embodiments. There may be many different forms of embodiments of the disclosure, and as such, embodiments should not be limited to those set forth herein and shown in the accompanying drawings. While exemplary embodiments of the disclosure may be shown and described herein, changes and modifications may be made without departing from its scope and concepts. That which is set forth herein and shown in the accompanying drawings is offered to illustrate the principles of the disclosure and one or more embodiments, and not as limitations. Other variations of the disclosure may be included within the principles of the disclosure.

In one or more embodiments, each description of the disclosure expressly, inherently and illustrated herein, may be implemented in no, one or more than one embodiment. In one or more embodiments, regardless of whether disclosed expressly, inherently or illustrated herein, the disclosure may be configurable, adaptable and customizable to meet the various needs of various users in various circumstances and/or to be compatible and/or used in conjunction with various systems, apparatuses, articles, devices, means, methods and structures.

In one or more embodiments, the disclosure may be configured in various ways, by various means and/or methods, with various parts, to various dimensions (such as, for example, but limited to shapes, widths, heights, depths, and/or sizes) and/or with various materials. For example, in one or more embodiments, the specific parts, materials, members, devices, systems and/or components of the disclosure may be configured together, separate and/or with other materials, members, devices, systems and/or components and/or combinations thereof In one or more embodiments, the drawings herein may but do not necessarily illustrate the disclosure to scale. In one or more embodiments, the drawings herein may but do not necessarily depict the exact positions, sizes, shapes, sizes, layouts, designs, angles and/or other dimensions and/or configurations in which the disclosure may be implemented.

In one or more embodiments, the disclosure may be used for various uses and/or for various purposes. In one or more implementations, the disclosure may be used in conjunction with a center pivot irrigation system to irrigate soils and crops.

In one or more embodiments, the disclosure may include an irrigation system 7. Irrigation system 7 may include a center pivot irrigation system and at least one irrigation apparatus.

Aspects of irrigation system 7 (including but not limited to aspects of the center pivot irrigation system and at least one irrigation apparatus) may be formed from various materials. For example, in one or more embodiments, the material used to configure aspects of irrigation system 7 may include metals (such as, for example, but not limited to aluminum, silver, gold, europium, neptunium, cobalt, iron, copper, nickel, lead, lithium, calcium, titanium, tin, etc.), non-metals (such as, for example, but not limited to carbon, sulfur, chlorine, argon, etc.), metalloids (such as, for example, but not limited to boron, tellurium, etc.), ceramics (such as, for example, but not limited to alumina, silicon, tungsten, granite, limestone, marble, slate, quartzite, etc.), polymers and plastics (such as, for example, but not limited to natural rubbers, synthetic rubbers, polyvinyl chloride (PVC), PC, high density polyethylene (HDPE), oriented or stretch blown polyethylene terephthalate (PET), polypropylene (PP), acrylonitrile butadiene styrene (ABS), polycarbonate, etc.), alloys (such as, for example, but not limited to alloys of aluminum, alloys of bismuth, alloys of chromium, alloys of cobalt, alloys of copper, alloys of gallium, alloys of gold, alloys of indium, alloys of iron, alloys of lead, alloys of magnesium, alloys of mercury, alloys of nickel, alloys of plutonium, alloys of potassium, rare earth alloys, alloys of rhodium, alloys of scandium, alloys of silver, alloys of sodium, alloys of titanium, alloys of tin, alloys of uranium, alloys of zinc, alloys of zirconium, etc.), woods and natural products (such as, for example, but not limited to hickory, aspen, maple, cedar, spruce, hemlock, pine, oak, walnut, elm, fir, mahogany, kunststoff, etc.), and the like other materials may be used to configured aspects of irrigation system 7. Each type of material may have various characteristics. For example, in one or more embodiments, steel, which may be a combination of iron, carbon and/or other elements, may include mild-carbon steel, medium-carbon steel and/or high-carbon steel. Other elements may be added to steel such as, for example, but not limited to nickel, chromium, and tungsten. Steel may be stainless steel and/or speed steel. Steel may be subject to various heat treatment techniques and/or various other treatments such as rhino lining, galvanizations or other corrosion resistant treatment, and/or other treatments for various purposes.

In one or more embodiments, the center pivot irrigation system which may be included in irrigation system 7 (such as, for example, but not limited to center pivot irrigation system 120) may include, among other things, a pump, a center pivot, a suspended pipeline, at least one support tower which moves the pipeline around the pivot, and other relevant components, whether existing at the time of filing or hereafter discovered.

In one or more embodiments, at least one aspect of the center pivot irrigation system may be obtained and/or modified from existing technology. For example, U.S. Pat. No. 4,340,183 A (entitled "Corner system addition for a center pivot irrigation system"), U.S. Pat. No. 4,662,563 A (entitled "Center pivot irrigation system"), U.S. Pat. No. 8,659,385 B2 (entitled "Center pivot irrigation system diagnostic tool") and U.S. Pat. No. 3,902,668 A (entitled "Center-pivot irrigation system") illustrate various aspects of center pivot irrigation system technologies. In one or more embodiments, the elements, principles, structures, techniques, and methods of the aforementioned patents may be combined in any manner with any of the elements, principles, structures, techniques, and methods of the present disclosure. All of the subject matter and disclosures of the aforementioned patents are incorporated herein by reference in their entirety. In one or more embodiments, at least one aspect of the center pivot irrigation system may be obtained and/or modified from various retailers and/or manufactures, such as, for example, but not limited to Zimmatic, Valley, Reinke, T-L Irrigation and the like or other retailers and/or manufactures.

In one or more embodiments, the at least one irrigation apparatus which may be included in irrigation system 7 (such as, for example, but not limited to irrigation apparatus 10) may be formed from various materials and to various dimensions. For example, in one or more embodiments, steel may be used in various components of at least one irrigation apparatus in the form of steel tubing which may be round, square, triangular, and/or shapes. The steel tubing may be solid and/or hollow. Other materials may include hoses, piping, clamps, fittings, valves, barbs, bushings, ties, nozzles, sprinklers, tubing, devises, carabiners, cables, ropes, tape, bungee cords, chains, straps, ties, turnbuckles, flat bars, tubing, struts, holes, nuts, bolts, eye bolts and the like and other materials, means and/or combinations thereof.

In one or more embodiments, one or more aspects of at least one irrigation apparatus may be configured in various way (including, for example, but not limited to being configured together and/or separate, releaseably and/or non-releaseably), including, for example, but not limited to the following: welding, melting, burning, gluing, cementing, screwing, fitting, snapping, clamping, clipping, pining, bolting, adhering, pressing, cutting, lasering, fastening, hooking, attaching, securing, connecting, pinching, cleaving, clinging, clasping, latching, machining, sticking, fitting, sliding, and the like or other materials, adhesives, devices, systems, means, and methods, and/or combinations thereof.

In one or more embodiments, one or more aspects of at least one irrigation apparatus may vary greatly and be composed of various parts, materials, configurations (including, for example, but not limited to various shapes, sizes, heights, widths, lengths, weights, and/or other dimensions and/or characteristics), aspects, features and functionalities, whether illustrated in the drawings or not and whether available at the time of filing or hereafter discovered. All such variations are contemplated herein and may implement the principles of the disclosure.

The irrigation apparatus may be configured to operate with and irrigate various soils (such as, for example, but not limited to, sandy soils, clay soils, silty soils, loam soils, chalky soils, and peaty soils), various crops (such as, for example, but not limited to, potatoes, barley, wheat, corn, cotton, corn, sugarcane, pumpkin, soybeans, hay, lettuce, as well as over or under crop canopies), on various terrains (such as, for example, but not limited to, flat, sloped, uniform, and/or non-uniform), and during various conditions (such as, for example, but not limited to rain, sleet, hail, sun, snow, below, at and/or above freezing).

At least one objective of the disclosure may be to provide for at least one irrigation apparatus to be pulled/towed and/or pushed by a center pivot irrigation system. At least one objective of the disclosure may be to provide for at least one irrigation apparatus to receive water from a center pivot irrigation system and channel the water received to at least one sprinkler assembly for distribution onto soils and crops. At least one objective of the disclosure may be to reduce and/or eliminate rut formation by rerouting and spraying water sufficiently far enough behind at least one support tower of a center pivot irrigation system so that at least one support tower does not travel over wet ground. At least one objective of the disclosure may be to maintain the same, substantially similar, different and/or better crop coefficients, spray patterns, watering rates, and/or watering quantity compared to what was achievable by the center pivot irrigation system without the disclosure.

In one or more embodiments, at least one irrigation apparatus may be configured with at least one means for stabilizing, reinforcing, strengthening and/or counteracting certain forces and/or movements associated with aspects of at least one irrigation apparatus. Such means may vary and may include, for example, but not limited to devises, carabiners, cables, ropes, tape, bungee cords, chains, straps, ties, turnbuckles, flat bars, tubing, struts, holes, nuts, bolts, eye bolts, welding and the like and other means and/or combinations thereof. In one or more embodiments, irrigation apparatuses may be configured with at least one strut (such as, for example, but not limited to struts 128a, 128b, 142a, 142b, 135a and 135b) that may configure at least one aspect of the irrigation apparatuses to the same or at least one other aspects of the irrigation apparatuses. The at least one strut may be configured to various dimensions and various characteristic. For example, the length and thickness of the at least one strut may be configured to handle various load capacities. The at least one strut may be configured to aspects of the irrigation apparatuses in various ways and by various means. For example, at least strut may be releasably configured to various aspects of irrigation apparatuses which may allow a user to disassemble, transport and reassemble at least one strut to the irrigation apparatuses.

In one or more embodiments, at least one irrigation apparatus may be configured with at least one sprinkle assembly (such as, for example, but not limited to pivot sprinkler assemblies and apparatus sprinkler assemblies). The sprinkler assemblies may be configured with various materials and to various dimensions. In one or more embodiments, at least one aspect of the sprinkler assemblies may be obtained and/or modified from existing technology. For example, U.S. Pat. No. 4,014,502 A (entitled "Lawn, farm, and orchard sprinklers"), U.S. Pat. No. 7,325,756 B1 (entitled "Roll-sprinkler irrigation system"), U.S. Pat. No. 3,361,364 A (entitled "Crop-guard for agricultural irrigation sprinklers"), U.S. Pat. No. 5,090,621 A (entitled "Constant drive nozzle for impulse irrigation sprinklers"), U.S. Pat. No. 7,311,004 B2 (entitled "Flow control and operation monitoring system for individual spray nozzles"), U.S. Pat. No. 3,104,829 A (entitled "Vane unit for spray nozzles"), U.S. Pat. No. 6,402,062 B1 (entitled "High-pressure spray nozzle"), U.S. Pat. No. 4,221,334 A (entitled "Adjustable nozzle for crop spraying"), U.S. Pat. No. 8,550,383 B2 (entitled "Automatic switching directional nozzles in irrigation systems") and U.S. Pat. No. 5,505,386 A (entitled "Replacement drop sprinkler assembly") illustrate various aspect of sprinkler assembly technologies. In one or more embodiments, the elements, principles, structures, techniques, and methods of the aforementioned patents may be combined in any manner with any of the elements, principles, structures, techniques, and methods of the present disclosure. All of the subject matter and disclosures of the aforementioned patents are incorporated herein by reference in their entirety. In one or more embodiments, at least one aspect of the sprinklers, nozzles, sprays, values and other aspects of irrigation system 7 may be obtained and/or modified from various retailers and/or manufactures.

At least one irrigation apparatus may include at least one means for configuring it to a center pivot irrigation system. Such may be accomplished in various ways and by various means. For example, in one or more embodiments, at least one means for configuring irrigation apparatuses to a center pivot irrigation system may include a hitch configured to at least one aspect of an irrigation apparatus and a ball configured to at least one aspect of a center pivot irrigation system wherein said hitch may be configured to said ball such that the center pivot irrigation system may tow and/or push the irrigation apparatus as the center pivot irrigation system moves. A ball-hitch assembly which may be obtained and/or modified from existing technology. For example, U.S. Pat. No. 3,376,051 A (entitled "Trailer hitch"), U.S. Pat. No. 6,053,521 A (entitled "Load sensing trailer ball-hitch drawbar") and U.S. Pat. No. 7,273,223 B2 (entitled "Trailer hitch ball") illustrate various aspects of ball-hitch assemblies. In one or more embodiments, the elements, principles, structures, techniques, and methods of the aforementioned patents may be combined in any manner with any of the elements, principles, structures, techniques, and methods of the present disclosure. All of the subject matter and disclosures of the aforementioned patents are incorporated herein by reference in their entirety. Other means may be used as well and/or alternatively to a ball-hitch assembly. For example, in one or more embodiments, such means may be accomplished by use of devises, carabiners, cables, ropes, tape, bungee cords, chains, straps, ties, turnbuckles, flat bars, tubing, struts, holes, nuts, bolts, eye bolts and the like and other means and/or combinations thereof. In one or more embodiments, at least one aspect of a ball-hitch assembly may be obtained and/or modified from various retailers and/or manufactures.

Alternatively and/or in addition, in one or more embodiments, at least one means for configuring an irrigation apparatus to a center pivot irrigation system may include at least one rope and/or at least one strap configured to at least one aspect of an irrigation apparatus and to at least one aspect of a center pivot irrigation system such that the center pivot irrigation system may tow and/or push the irrigation apparatus 10 the center pivot irrigation system moves.

Alternatively and/or in addition, in one or more embodiments, at least one means for configuring an irrigation apparatus to a center pivot irrigation system may include at least one tubing or strut configured to at least one aspect of an irrigation apparatus and to at least one aspect of a center pivot irrigation system such that the center pivot irrigation system may tow and/or push the irrigation apparatus as the center pivot irrigation system moves.

In one or more embodiments, the at least one means for configuring an irrigation apparatus to a center pivot irrigation system may be done so in a releasable fashion. The configuration of at least one means for configuring an irrigation apparatus to a center pivot irrigation system may be done is such a way so as to allow the center pivot irrigation system to both pull/tow and/or push the irrigation apparatus, whether when the center pivot irrigation system is moving forward and/or in reverse.

FIG. 1 shows one embodiment of aspects of irrigation system 7 which may include a center pivot irrigation system 120 and at least one irrigation apparatus 10. Center pivot irrigation system 120 may include a pump 300, a pivot 303, a suspended pipeline 305, at least one support tower (such as, for example, but not limited to support tower 307) which moves the pipeline 305 around the pivot 303, and/or other components. Irrigation apparatus 10 may be configured with at least one back frame 12, at least one side frame 14 and/or at least one boom assembly 16. FIG. 1 shows one embodiment of wheels 40a, 40b and 40c facing in a reverse direction wherein the irrigation apparatus may be pushed backwards.

FIG. 2A shows a perspective view of one embodiment of aspects of irrigation apparatus 10 including aspects of at least one back frame 12, aspects of at least one side frame 14 and/or aspects of at least one boom assembly 16.

FIG. 2B shows a perspective view of one embodiment of aspects of irrigation apparatus 10 including aspects of at least one back frame 12, aspects of at least one side frame 14 and/or aspects of at least one boom assembly 16, albeit that the embodiment of the boom assembly 16 illustrated in FIG. 2B has fewer cables and other aspects as compared to the embodiment of boom assembly 16 illustrated in FIG. 2A.

FIG. 3A shows a rear view of one embodiment of aspects of at least one back frame 12 and aspects of at least one boom assembly 16.

FIG. 3B shows a rear view of one embodiment of aspects of at least one back frame 12 and aspects of at least one boom assembly 16, albeit that the embodiment of the boom assembly 16 illustrated in FIG. 3B has fewer cables, boom arms and other aspects as compared to the embodiment of boom assembly 16 illustrated in FIG. 3A.

Figure 4:
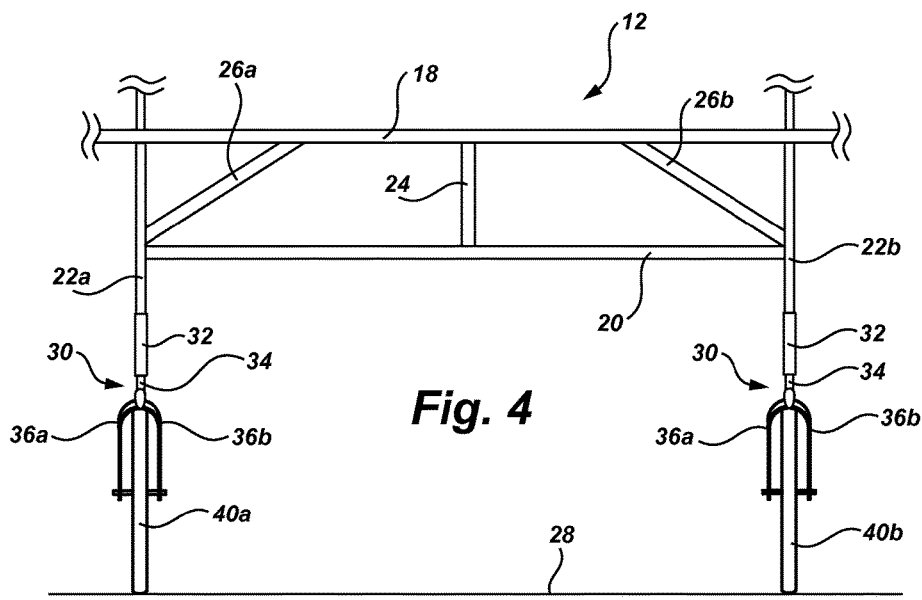
FIG. 4 shows one embodiment of aspects of at least one back frame.

FIG. 4 shows one embodiment of aspects of at least one back frame 12. Back frame 12 may be configured with at least one top back member (such as, for example, but not limited to top back member 18), at least one bottom back member (such as, for example, but not limited to bottom back member 20), and at least one back leg member (such as, for example, but not limited to back leg members 22a and 22b). Back frame 12 may include at least one middle back brace member (such as, for example, but not limited to middle back brace member 24). Back frame 12 may include at least one back brace member (such as, for example, but not limited to back brace members 26a and 26b). Various aspects of back frame 12 may be welded together and/or releaseably configured together.

Back frame 12 may be configured to various dimensions, in various ways and with various materials. For example, in one or more embodiments, top back member 18, bottom back member 20 and back leg members 22a and 22b may each be configured from round, square and/or other shaped steel tubing (such as, for example, but not limited to square steel tubing) and each may be between about ¼ of an inch to about 6 inches wide (such as, for example, but not limited to about 1 and ½ inch, about 1 and ¾ inch, and/or about 2 inches wide) and between about 0.001 of an inch to about 6 inches thick (such as, for example, but not limited to about 0.083 of an inch thick). Top back member 18, bottom back member 20 and back leg members 22a and 22b may each be configured with the same and/or different types and dimensioned tubing or other materials (such as, for example, but not limited to top back member 18 and bottom back member 20 may each be configured with about 1 and ¾ inch wide steel tubing and back leg members 22a and 22b may each be configured with about 2 inch wide steel tubing).

In one or more embodiments, top back member 18 may be between about 1 foot to about 25 feet in length (such as, for example but not limited to about 96 inches, about 8 feet or about 8 feet and ½ of an inch in length). Bottom back member 20 may be between about 1 foot to about 25 feet in length (such as, for example, but not limited to about 94.25 inches, about 92 and ¾ inches or about 94 and ¼ inches in length). Back leg members 22a and 22b may each be between about 1 foot to about 25 feet in length (such as, for example, but not limited to about 30 inches, about 30.85 inches, or about 3 feet in length).

In one or more embodiments, middle back brace member 24 may be configured from steel flat bar which may be between about ¼ of an inch to about 2 feet wide (such as, for example, but not limited to about 2 inches wide) and between about ⅛ of an inch to about 6 inches thick (such as, for example, but not limited to about ¼ of an inch thick) and between about 1 inch to about 10 feet in length (such as, for example, but not limited to about 18 inches in length) and may be welded to top back member 18 and bottom back member 20 at between about 5 degree angles to about 90 degree angles (such as, for example, but not limited to about 90 degree angles).

In one or more embodiments, back brace members 26a and 26b may each be configured from steel flat bars which may each be between about ¼ of an inch to about 2 feet wide (such as, for example, but not limited to about 2 inches wide) and between about ⅛ of an inch to about 6 inches thick (such as, for example, but not limited to about ¼ of an inch thick) and between about 1 inch to about 10 feet in length (such as, for example, but not limited to about 20 inches or about 29 inches in length) and each may be welded to top back member 18, bottom back member 20, and/or to back leg members 22a and 22b at between about 5 degree angles to about 90 degree angles (such as, for example, but not limited to about 30 degree angles, about 45 degree angles or about 52 degree angles).

Each back leg member may be configured with at least one means for enabling irrigation apparatus 10 to move over soils 28 and crops. The at least one means for enabling irrigation apparatus 10 to move over soils 28 and crops may be accomplished in and be configured to irrigation apparatus 10 in various ways and by various means. For example, in one or more embodiments, each back leg member may be configured to a separate mobility assembly 30. Each mobility assembly 30 may include at least two off-centered orientable wheels 40a and 40b or other aspects of means for enabling irrigation apparatus 10 to move over soils 28 and crops. Wheel 40a may be configured to a mobility assembly 30 which may be configured to back leg member 22a and wheel 40b may be configured to another mobility assembly 30 which may be configured to back leg member 22b.

Figure 5A:
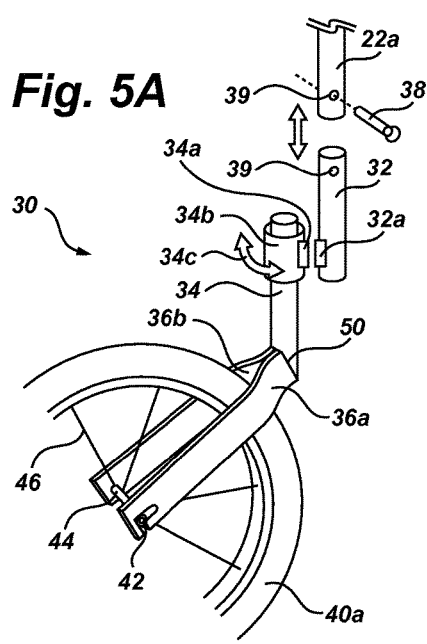
FIG. 5A shows an exploded view of one embodiment of at least one mobility assembly.

FIG. 5A shows an exploded view of one embodiment of at least one mobility assembly (such as, for example, but not limited to mobility assembly 30). Mobility assembly 30 may include a first member 32, a second member 34, and at least one flat bar (such as, for example, but not limited to flat bars 36a and 36b).

First member 32 may be configured to second member 34 in various ways and by various means. For example, in one or more embodiments, second member 34 may include a rotation assembly 34b. First member 32 may include a spacer 32a and rotation assembly 34b may include a spacer 34a. Spacer 32a may be welded to spacer 34a. Rotation assembly 34b may enable second member 34 to rotate and/or be orientable 34c (such as, for example, but not limited to being able to swivel about 360 degrees). Alternatively and/or in addition, first member 32 may be configured to second member 34 via a combination of holes, nuts, bolts, and/or pins.

Second member 34 may be configured to at least one flat bar (such as, for example, but not limited to flat bars 36a and 36b) in various ways and by various means. For example, in one or more embodiments, second member 34 may be welded to flat bars 36a and 36b. At least one flat bar (such as, for example, but not limited to flat bars 36a and 36b) may be configured to aspects of at least one means for enabling irrigation apparatus 10 to move over soils 28 and crops in various ways and by various means. For example, in one or more embodiments, flat bars 36a and 36b may be configured to wheel 40a. The angle 50 by which flat bars 36a and 36b may be configured to second member 34 may be such that wheel 4a is off-centered and rotatable. Such configuration may allow wheel 40a to rotate when irrigation apparatus 10 is in motion, including being able to be pushed and/or pulled the irrigation apparatus 10 in any desirable direction. Wheel 40a may include a releasable axle 42, a hub 44 and spokes 46. In one or more embodiments, wheel 40a or other aspects of means for enabling irrigation apparatus 10 to move over soils 28 and crops may include various components and/or functionalities, such as, for example, but not limited to quick release capabilities. In one or more embodiments, quick release components and/or functionalities may be obtained and/or modified from existing technology. For example, U.S. Pat. No. 8,820,854 B2 (entitled "Bicycle wheel quick release assembly with clockable handle") and U.S. Pat. No. 7,954,906 B2 (entitled "Quick release bicycle wheel") illustrate various aspects of quick release components and/or functionalities. In one or more embodiments, the elements, principles, structures, techniques, and methods of the aforementioned patents may be combined in any manner with any of the elements, principles, structures, techniques, and methods of the present disclosure. All of the subject matter and disclosures of the aforementioned patents are incorporated herein by reference in their entirety.

First member 32 may be configured to back leg member 22a in various ways and by various means. For example, in one or more embodiments, first member 32 may be configured to have a smaller circumference or perimeter than back leg member 22a and back leg member 22a may be configured to have a hollow center which may be configured to receive, cover and/or surround first member 32 when it may be inserted into back leg member 22. Back leg member 22a and first member 32 may be configured with holes 39 which, when aligned, may receive a pin 38, and/or a nut and a bolt, which configuration may releaseably secure first member 32 to back leg member 22a. Back leg members 22b may be similarly configured as back leg member 22a in order to receive a separate mobility assembly 30 or other means for enabling irrigation apparatus 10 to move over soils 28 and crops.

Aspects of mobility assembly 30 may be configured to various dimensions, in various ways and with various materials. For example, in one or more embodiments, first member 32 may be configured from round, square and/or other shaped steel tubing (such as, for example, but not limited to round steel tubing) which may be between about ¼ of an inch to about 6 inches wide (such as, for example, but not limited to about 1 and ½ inch or 1 and ¾ inch wide) and between about 0.001 of an inch to about 6 inches thick (such as, for example, but not limited to about 0.083 of an inch thick) and between about 1 inch to about 25 feet in length (such as, for example but not limited to about 15 inches or about 16 inches in length).

In one or more embodiments, spacers 32a and 34a may each be configured from steel flat bars which may each be between about ¼ of an inch to about 6 inches wide (such as, for example, but not limited to about 2 inches wide) and between about ⅛ of an inch to about 6 inches thick (such as, for example, but not limited to about a ¼ of an inch thick) and between about a ¼ of an inch to about 3 feet in length (such as, for example, but not limited to about 3 inches in length)

In one or more embodiments, second member 34 may be configured from a round, square and/or other shaped steel shaft (such as, for example, but not limited to a round steel shaft) which may be between about ¼ of an inch to about 6 inches wide (such as, for example, but not limited to about ¾ inch wide) and between about 1 inch to about 25 feet in length (such as, for example but not limited to about 8 inches in length). Alternatively, second member 34 may be configured from a round, square and/or other shaped steel tubing (such as, for example, but not limited to round steel tubing) which may be between about ¼ of an inch to about 6 inches wide (such as, for example, but not limited to about 1 and ½ inch or 1 and ¾ inch wide) and between about 0.001 of an inch to about 6 inches thick (such as, for example, but not limited to about 0.083 of an inch thick) and between about 1 inch to about 25 feet in length (such as, for example but not limited to about 15 inches or about 16 inches in length).

In one or more embodiments, rotation member 34b may include various materials of various dimensions, such as, for example, but not limited to bushings, washers and/or other components. Alternatively and/or in addition, rotation assembly 34b may include ball bearings, rollers and other means for enabling second member 34 to rotate and/or be orientable 34c.

In one or more embodiments, flat bars 36a and 36b may each be configured from steel flat bars which may each be between about ¼ of an inch to about 2 feet wide (such as, for example, but not limited to about 2 inches or about 3 inches wide) and between about ⅛ of an inch to about 6 inches thick (such as, for example, but not limited to about ⅜ of an inch or about ¼ of an inch thick) and between about 1 inch to about 10 feet in length (such as, for example, but not limited to about 18 inches or about 19 inches in length) and may be welded to second member 34 at between about 5 degree angles to about 90 degree angles (such as, for example, but not limited to about 30 degree angles, about 45 degree angles or about 52 degree angles).

In one or more embodiments, the wheels (such as, for example, but not limited to wheels 40a, 40b and 40c) configured to irrigation apparatus 10 may each be configured to mobility assembly 30 may be between about 4 inches to about 12 feet in diameter (such as, for example, but not limited to about 26 inches or about 30 inches in diameter) and between about ⅛ of an inch to about 4 feet wide (such as, for example, but not limited to about 2 inches wide). The wheels may be configured from various materials including but not limited to rubber (such as, for example, but not limited to synthetic rubber tires and/or garden cart wheels).

Figure 5B:
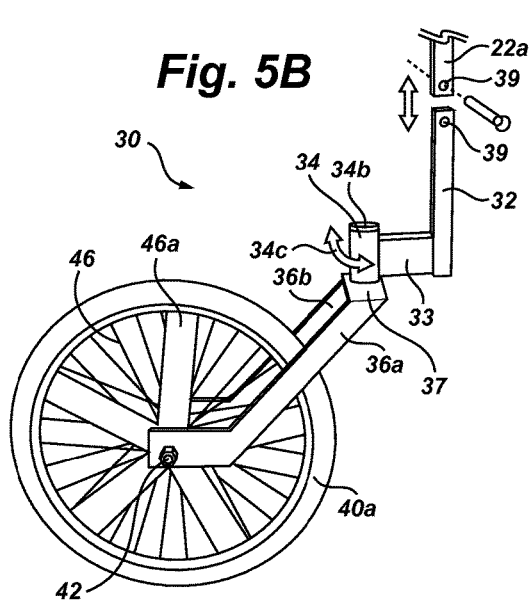
FIG. 5B shows an exploded view of another embodiment of at least one mobility assembly.

FIG. 5B shows an exploded view of one embodiment of at least one mobility assembly 30. The mobility assembly 30 illustrated in FIG. 5B may be similar to and/or different than the mobility assembly 30 illustrated in FIG. 5A. For example, mobility assembly 30 as illustrated in FIG. 5B may include first member 32, second member 34, and at least one flat bar (such as, for example, but not limited to flat bars 36a, 36b and 37).

First member 32 may be configured to second member 34 in various ways and by various means. For example, in one or more embodiments, first member 32 may be welded to spacer 33 on one end of spacer 33 and second member 34 may be welded to spacer 33 on the other end of spacer 33. Alternatively and/or in addition, first member 32 may be configured to second member 34 via a combination of holes, nuts, bolts, and/or pins. Second member 34 may include a rotation assembly 34b. Rotation assembly 34b may enable second member 34 to rotate and/or be orientable 34c (such as, for example, but not limited to being able to swivel about 360 degrees).

Second member 34 may be configured to at least one flat bar (such as, for example, but not limited to flat bar 37) in various ways and by various means. For example, in one or more embodiments, second member 34 may be welded to flat bar 37. Flat bar 37 may be welded to flat bars 36a and 36b. At least one flat bar (such as, for example, but not limited to flat bars 36a and 36b) may be configured to aspects of at least one means for enabling irrigation apparatus 10 to move over soils 28 and crops in various ways and by various means. For example, in one or more embodiments, flat bars 36a and 36b may be configured to wheel 40a. The angle 50 by which flat bars 36a and 36b may be configured to flat bar 37 may be such that wheel 40a is off-centered and rotatable. Such configuration may allow wheel 40a to rotate when irrigation apparatus 10 is in motion, including being able to be pushed and/or pulled the irrigation apparatus 10 in any desirable direction. Wheel 40a may include a releasable axle 42, a hub 44 (not shown in FIG. 5B), spokes 46 and/or blades 46a. In one or more embodiments, wheel 40a or other aspects of means of enabling irrigation apparatus 10 to move over soils 28 and crops may include various components and/or functionalities, such as, for example, but not limited to quick release capabilities via a nut and bolt and/or as stated above and as referred to in the patents stated above.

First member 32 may be configured to back leg member 22a in various ways and by various means. For example, in one or more embodiments, first member 32 may be configured to have a smaller circumference or perimeter than back leg member 22a and back leg member 22a may be configured to have a hollow center which may be configured to receive, cover and/or surround first member 32 when it may be inserted into back leg member 22. Back leg member 22a and first member 32 may be configured with holes 39 which, when aligned, may receive a pin 38, and/or a nut and a bolt, which configuration may releaseably secure first member 32 to back leg member 22a. Back leg members 22b may be similarly configured as back leg member 22a in order to receive a separate mobility assembly 30 or other means for enabling irrigation apparatus 10 to move over soils 28 and crops.

Aspects of mobility assembly 30 may be configured to various dimensions, in various ways and with various materials. For example, in one or more embodiments, first member 32 may be configured from round, square and/or other shaped steel tubing (such as, for example, but not limited to square steel tubing) which may be between about ¼ of an inch to about 6 inches wide (such as, for example, but not limited to about 1 and ½ inch wide) and between about 0.001 of an inch to about 6 inches thick (such as, for example, but not limited to about 0.083 of an inch thick) and between about 1 inch to about 25 feet in length (such as, for example but not limited to about 16 inches in length).

In one or more embodiments, spacer 33 may be configured from round, square and/or other shaped steel tubing (such as, for example, but not limited to rectangular steel tubing) which may be between about ¼ of an inch to about 6 inches wide (such as, for example, but not limited to about 1 and ½ inch wide) and between about ¼ of an inch to about 6 inches wide (such as, for example, but not limited to about 2 and ½ inch in height) and between about 0.001 of an inch to about 6 inches thick (such as, for example, but not limited to about 0.083 of an inch thick) and between about ⅛ of an inch to about 3 feet in length (such as, for example but not limited to about 4 inches in length).

In one or more embodiments, second member 34 may be configured from round, square and/or other shaped steel tubing (such as, for example, but not limited to square steel tubing) which may be between about ¼ of an inch to about 6 inches wide (such as, for example, but not limited to about 1 and ½ inch wide) and between about 0.001 of an inch to about 6 inches thick (such as, for example, but not limited to about 0.083 of an inch thick) and between about 1 inch to about 25 feet in length (such as, for example but not limited to about 4 inches in length).

In one or more embodiments, rotation member 34b may include various materials of various dimensions, such as, for example, but not limited to about a ¾ inch shaft, bushings, washers, nuts and/or other components. Alternatively and/or in addition, rotation assembly 34b may include ball bearings, rollers and other means for enabling second member 34 to rotate and/or be orientable 34c.

In one or more embodiments, flat bar 37 may be configured from steel flat bars which may each be between about ¼ of an inch to about 2 feet wide (such as, for example, but not limited to about 3 inches wide) and between about ⅛ of an inch to about 6 inches thick (such as, for example, but not limited to about ⅜ of an inch thick) and between about 1 inch to about 10 feet in length (such as, for example, but not limited to about 5 inches in length).

In one or more embodiments, flat bars 36a and 36b may each be configured from steel flat bars which may each be between about ¼ of an inch to about 2 feet wide (such as, for example, but not limited to about 3 inches wide) and between about ⅛ of an inch to about 6 inches thick (such as, for example, but not limited to about ⅜ of an inch thick) and between about 1 inch to about 10 feet in length (such as, for example, but not limited to about 18 inches in length) and may be welded to flat bar 37 at between about 5 degree angles to about 90 degree angles (such as, for example, but not limited to about 30 degree angles, about 45 degree angles or about 52 degree angles).

In one or more embodiments, the wheels (such as, for example, but not limited to wheels 40a, 40b and 40c) configured to irrigation apparatus 10 may each be configured to mobility assembly 30 may be between about 4 inches to about 12 feet in diameter (such as, for example, but not limited to about 26 inches or about 30 inches in diameter) and between about ⅛ of an inch to about 4 feet wide (such as, for example, but not limited to about 2 inches wide). The wheels may be configured from various materials including but not limited to rubber (such as, for example, but not limited to synthetic rubber tires and/or garden cart wheels).

In one or more embodiments, blades 46a may reinforce the wheels, ensure the weight bearing capacity of the wheels and/or aid the wheels in their rotatability and/or orientably. Blades 46a may be configured from steel flat bars which may each be between as wide, long and thick as the wheel may permit (such as, for example, but not limited to about 2 and ½ inches wide, about ⅛ of an inch thick, and about 13 inches long. Blades 46a may be welded onto the wheel well and/or other components.

Although not shown in FIGS. 5A and 5B, there may be various other ways to configure mobility assemblies, such as, for example, but not limited to mobility assemblies may include one or more wheels, wheels with traction devices attached, tracks, skies and the like and other devices. All such configurations are anticipated by this disclosure.

FIG. 6 shows one embodiment of aspects of at least one back frame 12 and aspects of at least one boom assembly 16. Boom assembly 16 may include at least one boom arm (such as, for example, but not limited to boom arms 52a, 52b, 52c and 52d or more boom arms). Although FIG. 6 shows boom assembly 16 including four boom arms, more or less boom arms may be configured to boom assembly 16 (see FIG. 3B).

At least one boom arm may be configured to another boom arm and/or to at least one top back member (such as, for example, top back member 18) in various ways and by various means. For example, in one or more embodiments, boom arms 52a, 52b, 52c and 52d may each be configured with two ends, a first end 54a, 54b, 54c and 54d respectively and a second end 56a, 56b, 56c and 56d respectively. At least one of the first ends 54a, 54b, 54c and 54d of at least one boom arm may be configured to have a smaller circumference or perimeter than at least one of the second ends 56a, 56b, 56c and 56d of another boom arm. At least one of the second ends 56a, 56b, 56c and 56d of at least one boom arm may have a hollow center which may be configured to receive, cover and/or surround at least one of the first ends 54a, 54b, 54c and 54d of another boom arm.

At least one top back member (such as, for example, but not limited to top back member 18) may be configured with two ends, an end 60a and an end 60b. At least one first end 54a, 54b, 54c and 54d of at least one boom arm may be configured to have a smaller circumference or perimeter than end 60a and/or end 60b. At least one of the ends 60a and 60b may have a hollow center which may receive, cover and/or surround at least one of the first ends 54a, 54b, 54c and 54d.

In one or more embodiments, boom arms may be configured to various dimensions, in various ways and with various materials. For example, in one or more embodiments, boom arms 52a, 52b, 52c and 52d may each be configured from round, square and/or other shaped steel tubing (such as, for example, but not limited to square steel tubing) and each may be between about ¼ of an inch to about 6 inches wide (such as, for example, but not limited to about 1 inch, about 1 and ½ inch or about 1 and ¾ inch wide) and between about 0.001 of an inch to about 6 inches thick (such as, for example, but not limited to about 0.083 of an inch thick) and between about 12 inches to about 100 feet in length (such as, for example but not limited to about 8 feet or about 13 feet and 4 inches or about 78 inches or about 120 inches in length).

In one or more embodiments, first ends may be configured to various dimensions, in various ways and with various materials. For example, in one or more embodiments, first end 54a, 54b, 54c and 54d may each be configured from round, square and/or other shaped steel shaft or tubing (such as, for example, but not limited to a round steel shaft) and each may be between about ¼ of an inch to about 6 inches wide (such as, for example, but not limited to about 1 and ¼ inch or about 1 and ½ inch wide) and between about 1 inch to about 8 feet in length (such as, for example but not limited to about 6 inches in length). Each first end may be welded to the boom arms which may be configured to be inserted into another boom arm and/or top back member 18.

FIG. 6 also shows one embodiment of boom assembly 16. Boom assembly 16 may include various means for supporting, holding into position, securing and/or reinforcing the configuration of at least one boom arm to irrigation apparatus 10 in various ways and by various means. For example, in one or more embodiments, boom assembly 16 may include at least one vertical post assembly (such as, for example, but not limited to vertical post assemblies 64a and 64b), a flat bar 102a, at least one cable (such as, for example, but not limited to cables 92a, 92b, 92c and 92d) and at least one eye bolt (such as, for example, but not limited to eye bolts 95a, 95b, 95c, 95d, 95e and 95f).

More will be discussed with regards to vertical post assemblies below. Flat bar 102a may be configured to both vertical post assemblies 64a and 64b which may provide reinforcement and/or stability. At least one cable (such as, for example, but not limited to cables 92a, 92b, 92c and 92d) may be configured to at least one boom arm (such as, for example, but not limited to boom arms 52a, 52b, 52c and 52d) via at least one eye bolt (such as, for example, but not limited to eye bolts 95a, 95b, 95c and 95d) which may be configured to various locations on at least one boom arm. At least one cable (such as, for example, but not limited to cables 92a, 92b, 92c and 92d) may be configured to at least one vertical post assembly (such as, for example, but not limited to vertical post assemblies 64a and 64b) via at least one eye bolt (such as, for example, but not limited to eye bolts 95e and 95f) which may be configured to various locations on at least one vertical post assembly.

In one or more embodiments, flat bar 102a may be configured to various dimensions, in various ways and with various materials. For example, in one or more embodiments, flat bar 102a may be configured from a steel flat bar which may be between about ¼ of an inch to about 2 feet wide (such as, for example, but not limited to about 2 inches or about 3 inches wide) and between about ⅛ of an inch to about 6 inches thick (such as, for example, but not limited to about ⅜ of an inch or about ¼ of an inch or about ½ of an inch thick) and between about 1 inch to about 25 feet in length (such as, for example, but not limited to about 8 feet and ½ of an inch in length).

In one or more embodiments, at least one cable (such as, for example, but not limited to cables 92a, 92b, 92c and 92d) may be configured to various dimensions, in various ways and with various materials. For example, in one or more embodiments, cables 92a, 92b, 92c and 92d may each be configured from about ⅛ inch wire rope, ¼ inch gauge cable, or heavy duty cable and each may be between about 12 inches to about 100 feet in length (such as, for example but not limited to about 9 feet or about 15 feet in length) and be capable of bearing between about 25 pounds to about 2000 pounds (such as, for example, but not limited to about 600 pounds). The number of cables configured to irrigation apparatus 10 may vary, such as, for example, one or more cables (see FIGS. 3A and 3B).

FIG. 7 is an exploded view of one embodiment of aspects of boom arms 52b and 52d wherein the first end 54d of boom arm 52d is approaching 58d the second end 56b of boom arm 52b. FIG. 7 shows boom arms 52b and 52d configured with round tubing. Similarly, as shown in FIG. 6, first end 54b of boom arm 52b may approach 58b end 60b of top back member 18 and first end 54a of boom arm 52a may approach 58a end 60a of top back member 18 wherein top back member 18 may be configured with round tubing.

FIG. 8 is an exploded view of one embodiment of aspects of boom arms 52b and 52d wherein the first end 54d of boom arm 52d is approaching 58d the second end 56b of boom arm 52b. FIG. 8 shows boom arms 52b and 52d configured with square tubing. Similarly, first end 54b of boom arm 52b may approach 58b end 60b of top back member 18 and first end 54a of boom arm 52a may approach 58a end 60a of top back member 18 wherein top back member 18 may be configured with square tubing.

Figure 9:
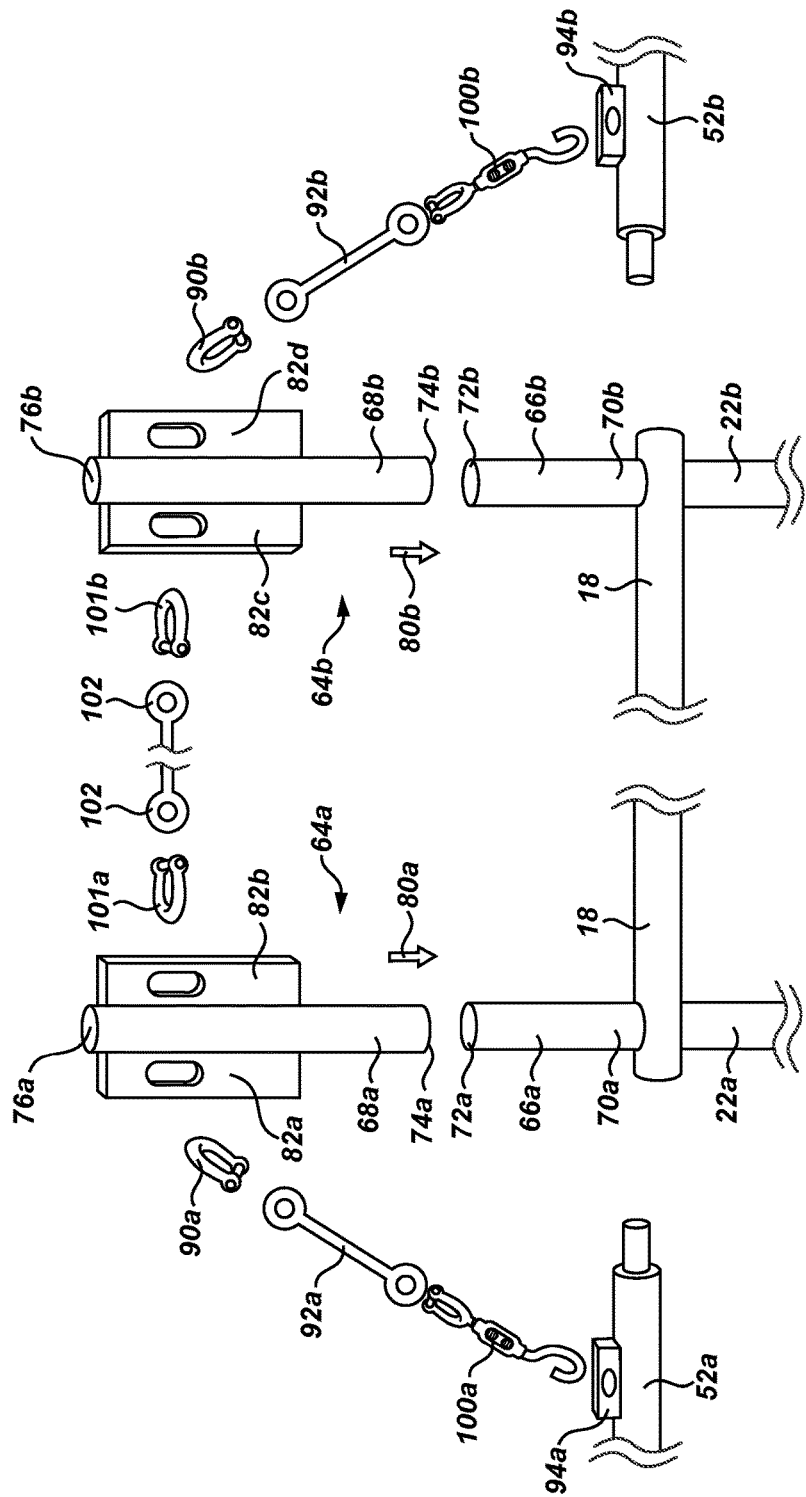
FIG. 9 shows one embodiment of aspects of at least one boom assembly.

FIG. 9 shows one embodiment of aspects of at least one boom assembly 16. Boom assembly 16 may include various means for supporting, holding into position, securing and/or reinforcing the configuration of at least one boom arm to irrigation apparatus 10 in various ways and by various means. For example, in one or more embodiments, boom assembly 16 may include at least one vertical post assembly (such as, for example, but not limited to vertical post assemblies 64a and 64b). Each vertical post assembly may be similarly or differently configured. Vertical post assembly 64a may include a permanent member 66a and a detachable member 68a, and vertical post assembly 64b may include a permanent member 66b and a detachable member 68b. Permanent members 66a and 66b may each include two ends, first ends 70a and 70b respectively and second ends 72a and 72b respectively. Detachable members 68a and 68b may each include two ends, first ends 74a and 74b respectively and second ends 76a and 76b respectively.

Permanent members 66a and 66b may be configured to top back member 18 at various locations on top back member 18 (such as, for example, but not limited to superior to back leg members 22a and 22b as shown in FIG. 9) in various ways and by various means. For example, in one or more embodiments, first ends 70a and 70b may be welded to top back member 18. Alternatively and/or in addition, permanent members 66a and 66b may be configured to top back member 18 via holes, pins, nuts and bolts. Permanent member 66a may be configured to detachable member 68a and permanent member 66b may be configured to detachable member 68b, in various ways and by various means. For example, in one or more embodiments, second ends 72a and 72b of permanent members 66a and 66b may be configured to have a smaller circumferences or perimeters than first ends 74a and 74b of detachable members 68a and 68b. First ends 74a and 74b may have hollow centers which may receive, cover and/or surround 80a, 80b the second ends 72a and 72b. Alternatively and/or in addition, second ends 72a and 72b of permanent members 66a and 66b may be configured to have a larger circumferences or perimeters than first ends 74a and 74b of detachable members 68a and 68b. Second ends 72a and 72b may have hollow centers which may receive, cover and/or surround 80a, 80b the first ends 74a and 74b.

At least one vertical post assembly may be configured to at least one boom arm (such as, for example, but not limited to boom arms 52a and 52b) in various ways and by various means. For example, in one or more embodiments, each detachable members 68a and 68b may be configured with at least one flat bar (such as, for example, but not limited to flat bars 82a, 82b, 82c and 82d). In one or more embodiments, flat bars 82a, 82b, 82c and 82d may be configured to or near the second ends 76a and 76b of detachable members 68a and 68b in various ways and by various means (such as, for example, but not limited to via welding). Each of the at least one flat bars (such as, for example, but not limited to flat bar 82a, 82b, 82c and 82d) may be configured with at least one hole for receiving and releaseably holding various means for configuring at least one vertical post assembly to at least one boom arm. Such configuration may be accomplished in various ways and by various means (such as, for example, but not limited to clevises, carabiners, cables, ropes, tape, bungee cords, chains, straps, ties, turnbuckles, flat bars, tubing, struts, holes, nuts, bolts, eye bolts, welding and the like and other means and/or combinations thereof).

At least one boom arm (such as, for example, but not limited to boom arms 52a and 52b) may be configured with at least one means for being configured to at least one vertical post assembly. For example, in one or more embodiments, each boom arm (such as, but not limited to boom arms 52a and 54b) may be configured with at least one flat bar (such as, for example, but not limited to flat bars 94a and 94b) in various ways and by various means (such as, for example, but not limited to via welding). Each of the at least one flat bars (such as, for example, but not limited to flat bars 94a and 94b) may be configured with a hole for receiving and releaseably holding various means for configuring at least one vertical post assembly to at least one boom arm. Such configuration may be accomplished in various ways and by various means (such as, for example, but not limited to clevises, carabiners, cables, ropes, tape, bungee cords, chains, straps, ties, turnbuckles, flat bars, tubing, struts, holes, nuts, bolts, eye bolts, welding and the like and other means and/or combinations thereof).

In one or more embodiments, boom arms 52a and 52b may be configured to detachable member 64a and 64b as follows: turnbuckles 100a and 100b may be configured to flat bars 94a and 94b on one end (which may be configured to boom arms 52a and 52b) and to cables 92a and 92b on the other end; cables 92a and 92b may be configured to clevises 90a and 90b on one end; and clevises 90a and 90b may be configured to flat bars 82a and 82b (which may be configured to detachable members 64a and 64b). Although not shown in FIG. 9, boom arms 52b and 52d may be configured to detachable member 64a and 64b in a similar or different way and/or by similar or different means. Although not shown in FIG. 9, one or more eye bolts may be used instead of one or more flat bars (see FIGS. 3B and 6).

At least one vertical post assembly may be configured to at least one other vertical post assembly in various ways and by various means (such as, for example, but not limited to clevises, carabiners, cables, ropes, tape, bungee cords, chains, straps, ties, turnbuckles, flat bars, tubing, struts, holes, nuts, bolts, eye bolts, welding and the like and other means and/or combinations thereof). For example, in one or more embodiments, clevis 101a may be configured to flat bar 82b on one end (which may be configured to detachable member 64a) and cable 102 on the other end; cable 102 may be configured to clevis 101b; and clevis 101b may be configured to flat bar 82c (which may be configured to detachable member 64b). Although not shown in FIG. 9, at least one vertical post assembly may be configured to at least one other vertical post assembly via flat bar 102a instead of devises 101a and 101b, cable 102, and flat bars 82b and 82c.

Aspects of various means for supporting, holding into position, securing and/or reinforcing the configuration of at least one boom arm to irrigation apparatus 10 may be configured to various dimensions, in various ways and with various materials. For example, in one or more embodiments, vertical post assemblies 64a and 64b may each be configured from round, square and/or other shaped steel tubing (such as, for example, but not limited to square steel tubing) and each may be between about ¼ of an inch to about 6 inches wide (such as, for example, but not limited to about 1 and ½ inch or about 1 and ¾ inch wide) and between about 0.001 of an inch to about 6 inches thick (such as, for example, but not limited to about 0.083 of an inch thick) and between about 1 inch to about 25 feet in length (such as, for example but not limited to about 30 inches in length).

In one or more embodiments, permanent members 66a and 66b may each be configured from round, square and/or other shaped steel tubing (such as, for example, but not limited to square steel tubing) and each may be between about ¼ of an inch to about 6 inches wide (such as, for example, but not limited to about 1 and ½ inch or about 1 and ¾ inch wide) and between about 0.001 of an inch to about 6 inches thick (such as, for example, but not limited to about 0.083 of an inch thick) and between about 1 inch to about 25 feet in length (such as, for example but not limited to about 4 inches or about 6 inches in length).

In one or more embodiments, detachable members 68a and 68b may each be configured from round, square and/or other shaped steel tubing (such as, for example, but not limited to square steel tubing) and each may be between about ¼ of an inch to about 6 inches wide (such as, for example, but not limited to about 1 and ½ inch or about 1 and ¾ inch wide) and between about 0.001 of an inch to about 6 inches thick (such as, for example, but not limited to about 0.083 of an inch thick) and between about 1 inch to about 25 feet in length (such as, for example but not limited to about 30 inches in length).

In one or more embodiments, cables 92a and 92b may each be configured from about ⅛ inch wire rope, ¼ inch gauge cable, or heavy duty cable and each may be between about 12 inches to about 100 feet in length (such as, for example but not limited to about 9 feet or about 15 feet in length) and be capable of bearing between about 25 pounds to about 2000 pounds (such as, for example, but not limited to about 600 pounds). The number of cables configured to irrigation apparatus 10 may vary, such as, for example, one or more cables (see FIGS. 3A and 3B).

In one or more embodiments, flat bars 94a, 94b, 82a, 82b, 82c and 82d may each be configured from steel flat bars which may each be between about ¼ of an inch to about 2 feet wide (such as, for example, but not limited to about 2 inches or about 3 inches wide) and between about ⅛ of an inch to about 6 inches thick (such as, for example, but not limited to about ⅜ of an inch or about ¼ of an inch thick) and between about 1 inch to about 10 feet in length (such as, for example, but not limited to about 6 inches or about 10 inches in length).

Although not shown in FIGS. 6, 7, 8 and 9, there may be various other ways to configure the means for supporting, holding into position, securing and/or reinforcing the configuration of at least one boom arm to irrigation apparatus. All such configurations are anticipated by this disclosure.

Although not shown in FIGS. 6, 7, 8 and 9 there may be various other ways to configure boom assemblies. All such configurations are anticipated by this disclosure.

FIG. 10 shows one embodiment of aspects of at least one side frame 14. Side frame 14 may include at least one top side member (such as, for example, but not limited to top side member 104), at least one bottom side member (such as, for example, but not limited to bottom side member 106), at least one front leg member (such as, for example, but not limited to front leg member 108), and at least one back side member (such as, for example, but not limited to back side member 110). Side frame 14 may include at least one middle side brace member (such as, for example, but not limited to middle side brace member 112). Side frame 14 may include at least one side brace member (such as, for example, but not limited to side brace members 114a and 114b).

Aspects of side frame 14 may be configured to various dimensions, in various ways and with various materials. For example, in one or more embodiments, top side member 104, bottom side member 106 and front leg member 108 may each be configured from round, square and/or other shaped steel tubing (such as, for example, but not limited to square steel tubing) and each may be between about ¼ of an inch to about 6 inches wide (such as, for example, but not limited to about 1 and ½ inch, about 1 and ¾ inch, and/or about 2 inches wide) and between about 0.001 of an inch to about 6 inches thick (such as, for example, but not limited to about 0.083 of an inch thick). Top side member 104, bottom side member 106 and front leg member 108 may each be configured with the same and/or different types and dimensioned tubing or other materials (such as, for example, but not limited to top side member 104 and bottom side member 106 may each be configured with about 1 and ¾ inch wide steel tubing and front leg member 108 may each be configured with about 2 inch wide steel tubing).

In one or more embodiments, top side member 104 may be between about 1 foot to about 25 feet in length (such as, for example but not limited to about 104.68 inches, about 92 and ¾ inches, about 94 and ¼ inches, about 8 feet, about 8 feet and ½ of an inch, or about 9 feet in length). Bottom side member 106 may be between about 1 foot to about 25 feet in length (such as, for example, but not limited to about 104.68 inches, about 92 and ¾ inches, about 94 and ¼ inches, about 8 feet, about 8 feet and ½ of an inch, or about 9 feet in length). Front leg member 108 may be between about 1 foot to about 25 feet in length (such as, for example, but not limited to about 30 inches, about 30.85 inches, or about 3 feet in length).

In one or more embodiments, top side member 104 and bottom side member 106 may each be configured to the at least one front leg member 108 at between about 5 degree angles to 180 degree angles (such as, for example, but not limited to about 85 degree angles). Top side member 104 and bottom side member 106 may each be configured to back side member 110 at between about 5 degree angles to 180 degree angles (such as, for example, but not limited to about 95 degree angles).

In one or more embodiments, back side member 110 may be configured from steel flat bar which may be between about ¼ of an inch to about 2 feet wide (such as, for example, but not limited to about 2 inches wide) and between about ⅛ of an inch to about 6 inches thick (such as, for example, but not limited to about ¼ of an inch thick) and between about 1 inch to about 10 feet in length (such as, for example, but not limited to about 18 inches in length) and may be welded to top side member 104 and bottom side member 106.

In one or more embodiments, middle side brace member 112 may be configured from steel flat bar which may be between about ¼ of an inch to about 2 feet wide (such as, for example, but not limited to about 2 inches wide) and between about ⅛ of an inch to about 6 inches thick (such as, for example, but not limited to about ¼ of an inch thick) and between about 1 inch to about 10 feet in length (such as, for example, but not limited to about 14 inches in length) and may be welded to top side member 104 and bottom side member 106 at between about 5 degree angles to about 90 degree angles (such as, for example, but not limited to about 90 degree angles).

In one or more embodiments, side brace members 114a and 114b may each be configured from steel flat bars which may each be between about ¼ of an inch to about 2 feet wide (such as, for example, but not limited to about 2 inches wide) and between about ⅛ of an inch to about 6 inches thick (such as, for example, but not limited to about ¼ of an inch thick) and between about 1 inch to about 10 feet in length (such as, for example, but not limited to about 27.85 inches, about 20 inches or about 29 inches in length) and each may be welded to top side member 104, bottom side member 106, and/or to front leg member 108 at between about 5 degree angles to about 90 degree angles (such as, for example, but not limited to about 3 degree angles, about 45 degree angles or about 52 degree angles).

Each front leg member may be configured with at least one means for enabling irrigation apparatus 10 to move over soils 28 and crops. The at least one means for enabling irrigation apparatus 10 to move over soils 28 and crops may be accomplished in and be configured to irrigation apparatus 10 in various ways and by various means. For example, in one or more embodiments, each front leg member may be configured to a separate mobility assembly 30. Mobility assembly 30 may include a wheel 40*c* which may be an off-centered orientable wheel configuration. In one or more embodiments, the at least one front leg member (such as, for example, but not limited to front leg member 108) may be configured to mobility assembly 30 in a similar and/or different fashion as compared to how back leg member(s) may be configured to mobility assembly 30 (see FIGS. 5A and 5B).

FIG. 10 also shows one embodiment of aspects of at least one side frame 14 approaching 118 aspects of at least one back frame 12.

FIG. 11 shows one embodiment of aspects of how at least one side frame 14 may be configured to at least one back frame 12. Back frame 12 may be configured to side frame 14 in various ways and by various means. For example, in one or more embodiments, back frame 12 may be releaseably configured to side frame 14. Such configuration may allow users to easily disassemble, transport and reassemble aspects of irrigation apparatus 10. In one or more embodiments, back frame's 12 middle back brace member 24 may be releaseably configured to side frame's 14 back side member 110. Back frame's 12 middle back brace member 24 may be configured as a flat bar and side frame's 14 back side member 110 may be configured as a flat bar. Each of the two flat bars may be configured with at least one hole (such as, for example, back side member's 110 flat bar may be configured with holes 122*a* and 122*b* and middle back brace member's 24 flat bar may be configured with holes 122*c* and 122*d*) which when the two flat bars may be positioned 118 together and the at least one hole in each flat bar may be properly aligned, the two flat bars may be configured together. In one or more embodiments, hole 122*a* may align with hole 122*c* and hole 122*b* may align with hole 122*d* and, when aligned, pins, nuts (e.g. 124*a*, 124*b*), bolts (e.g. 126*a*, 126*b*) and/or other means may be used to releaseably configure side frame 14 to back frame 12.

FIG. 12 shows one embodiment of at least one side frame 14 being configured to at least one back frame 12.

Although not shown in FIGS. 10, 11 and 12 there may be various other ways to configure side frames. All such configurations are anticipated by this disclosure.

Irrigation apparatus 10 may be configured with at least one means for stabilizing, reinforcing, strengthening and/or counteracting certain forces and/or movements associated with aspects of at least one irrigation apparatus. For example, in one or more embodiments, at least one strut and/or other means may be used to configure aspects of side frame 14 to aspects of back frame 12 and/or to aspects of boom assembly 16. Such configurations may prevent and/or minimize aspects of side frame 14 from moving, shifting and/or rotating laterally, vertically, radially, in and out, and/or otherwise and help secure it to aspects of back frame 12 and/or aspects of boom assembly 16. Such configurations may prevent and/or minimize aspects of back frame 12 and/or aspects of boom assembly 16 from moving, shifting and/or rotating laterally, vertically, radially, in and out, and/or otherwise and help secure it to aspects of side frame 14. Such configurations may prevent and/or minimize disruption of a desired water distribution patterns.

The specific configuration of at least one strut to various aspects of irrigation apparatus 10 may vary. For example, in one or more embodiments, holes may be drilled into at least one strut and the particular aspect of irrigation apparatus 10 the struts may be configured to, and when the holes are properly aligned, ties, pins, bolts and/or nuts or other means may be used to configure at least one strut to the particular aspect of irrigation apparatus 10 (see FIGS. 13A, 13B and 13C). In addition and/or alternatively, flat bars or other means may be configured to a particular aspect of irrigation apparatus 10 the struts may be configured to, and holes may be drilled into at least one strut and the flat bars or other means and when the holes are properly aligned, ties, pins, bolts and/or nuts or other means may be used to configure at least one strut to the flat bar or other means (see FIGS. 14A, 14B and 14C).

Irrigation apparatus 10 may include various numbers of struts and/or other means. For example, in one or more embodiments, irrigation apparatus 10 may include struts 128*a* and 128*b*. Alternatively and/or in addition, irrigation apparatus 10 may include struts 142*a* and 142*b*. Alternatively and/or in addition, irrigation apparatus 10 may include struts 128*a*, 128*b*, 142*a* and 142*b* (see FIGS. 13A and 14A). Alternatively and/or in addition, irrigation apparatus 10 may include struts 135*a* and 135*b* (see FIGS. 13B and 14B). Alternatively and/or in addition, irrigation apparatus 10 may include struts 128*a*, 128*b*, 135*a* and 135*b*. Alternatively and/or in addition, irrigation apparatus 10 may include struts 135*a*, 135*b*, 142*a* and 142*b*. Alternatively and/or in addition, irrigation apparatus 10 may include struts 128*a*, 128*b*, 135*a*, 135*b*, 142*a* and 142*b* (see FIG. 14D). Although not shown in the drawings contained herein, less or more struts or other means may be used to stabilize, reinforce, strengthen and/or counteract certain forces and/or movements associated with aspects of at least one irrigation apparatus.

Aspects of the struts may be configured to various dimensions, in various ways and with various materials. For example, in one or more embodiments, the struts may be configured from round, square and/or other shaped steel tubing (such as, for example, but not limited to round steel tubing).

Aspects of round steel tubing may be flattened (such as, for example, but not limited to the ends of the struts). The struts may be galvanized electrical conduit and/or electrical metal tubing (EMT). The struts may be between about ⅛ of an inch to about 5 inches in diameter (such as, for example, but not limited to about 1 inch in diameter). Each strut may be configured from the same and/or different materials and to the same and/or different dimensions.

FIGS. 13A, 13B, 13C, 14A, 14B, 14C and 14D show various embodiments of aspects of struts 128*a*, 128*b*, 142*a*, 142*b*, 135*a* and 135*b*, aspects of irrigation apparatus 10 and aspects of the process of configuring said struts to irrigation apparatus 10.

FIG. 13A shows a top view of one embodiment of aspects of struts 128*a*, 128*b*, 142*a* and 142*b* and aspects of irrigation apparatus 10.

Struts 128*a* and 128*b* may be configured to top side member 104 and to top back member 18. Although not shown in FIG. 13A, struts 128*a* and 128*b* may be configured to top side member 104 and to top back member 18 in various ways and at various locations which may form various angles. For example, angle 350 between strut 128a and top side member 104 may be between about 20 degrees to about 70 degrees; angle 351 between strut 128b and top side member 104 may be between about 20 degrees to about 70 degrees; angle 352 between strut 128a and top back member 18 may be between about 20 degrees to about 70 degrees; and angle 353 between strut 128b and top back member 18 may be between about 20 degrees to about 70 degrees. The various angles formed may be similar to and/or different than each other. Struts 128a and 128b may each be between about 3 feet to about 7 feet in length (such as, for example, but not limited to about 63.72 inches in length). The length of struts 128a and 128b may be similar to and/or different than each other. The length of struts 128a and 128b may vary and may be modified as needed.

Struts 142a and 142b may be configured to top side member 104 and to various boom arms (such as, for example, but not limited to boom arms 52a and 52b respectively). Although not shown in FIG. 13A, struts 142a and 142b may be configured to top side member 104 and to boom arms in various ways and at various locations which may form various angles. For example, angle 354 between strut 142a and top side member 104 may be between about 20 degrees to about 70 degrees; angle 355 between strut 142b and top side member 104 may be between about 20 degrees to about 70 degrees; angle 356 between strut 142a and boom arm 52a may be between about 20 degrees to about 70 degrees; and angle 357 between strut 142b and boom arm 52b may be between about 20 degrees to about 70 degrees. The various angles formed may be similar to and/or different than each other. Struts 142a and 142b may each be between about 7 feet to about 13 feet in length. The length of struts 142a and 142b may be similar to and/or different than each other. The length of struts 142a and 142b may vary and may be modified as needed. Although FIG. 13A shows struts 142a and 142b being configured to boom arms 52a and 52b, struts 142a and 142b may be configured to other boom arms provided (such as, for example, but not limited to boom arms 52c and/or 52d).

FIG. 13B shows a perspective view of one embodiment of aspects of struts 135a and 135b and other aspects of irrigation apparatus 10. Struts 135a and 135b may be configured to bottom side member 106 and to bottom back member 20. Although not shown in FIG. 13B, struts 135a and 135b may be configured to bottom side member 106 and to bottom back member 20 in various ways and at various locations which may form various angles. For example, the angle formed between strut 135a and bottom side member 106 may be between about 20 degrees to about 70 degrees; the angle between strut 135b and bottom side member 106 may be between about 20 degrees to about 70 degrees; the angle between strut 135a and bottom back member 20 may be between about 20 degrees to about 70 degrees; and the angle between strut 135b and bottom back member 20 may be between about 20 degrees to about 70 degrees. The various angles formed may be similar to and/or different than each other. Struts 135a and 135b may each be between about 3 feet to about 7 feet in length (such as, for example, but not limited to about 63.72 inches in length). The length of struts 135a and 135b may be similar to and/or different than each other. The length of struts 135a and 135b may vary and may be modified as needed.

FIG. 13C shows one embodiment of how two struts (such as, for example, but not limited to struts 128a, 128b, 142a, 142b, 135a and 135b) may be releaseably configured to each other and/or to other aspects of irrigation apparatus 10 (such as, for example, but not limited to top side member 104 and bottom side member 106). As shown in FIG. 13C, strut 142a may overlay strut 142b (or vice versa) which may overlay top side member 104. Holes may be drilled or otherwise configured to struts 142a and 142b and top side member 104 and when the holes are properly aligned, a bolt may be inserted through the respective holes and a nut fastened to the bolt to releaseably configure struts 142a and 142b and top side member 104 together. Although not shown in FIG. 13C, one or more struts may be configured to other aspects of irrigation apparatus 1 (such as, for example, but not limited to top back member 18 and/or boom arms 52a and 52b) in a similar fashion and/or with the use of different means (such as, for example, but not limited to ties, ropes, tape, etc.)

Figure 14D:
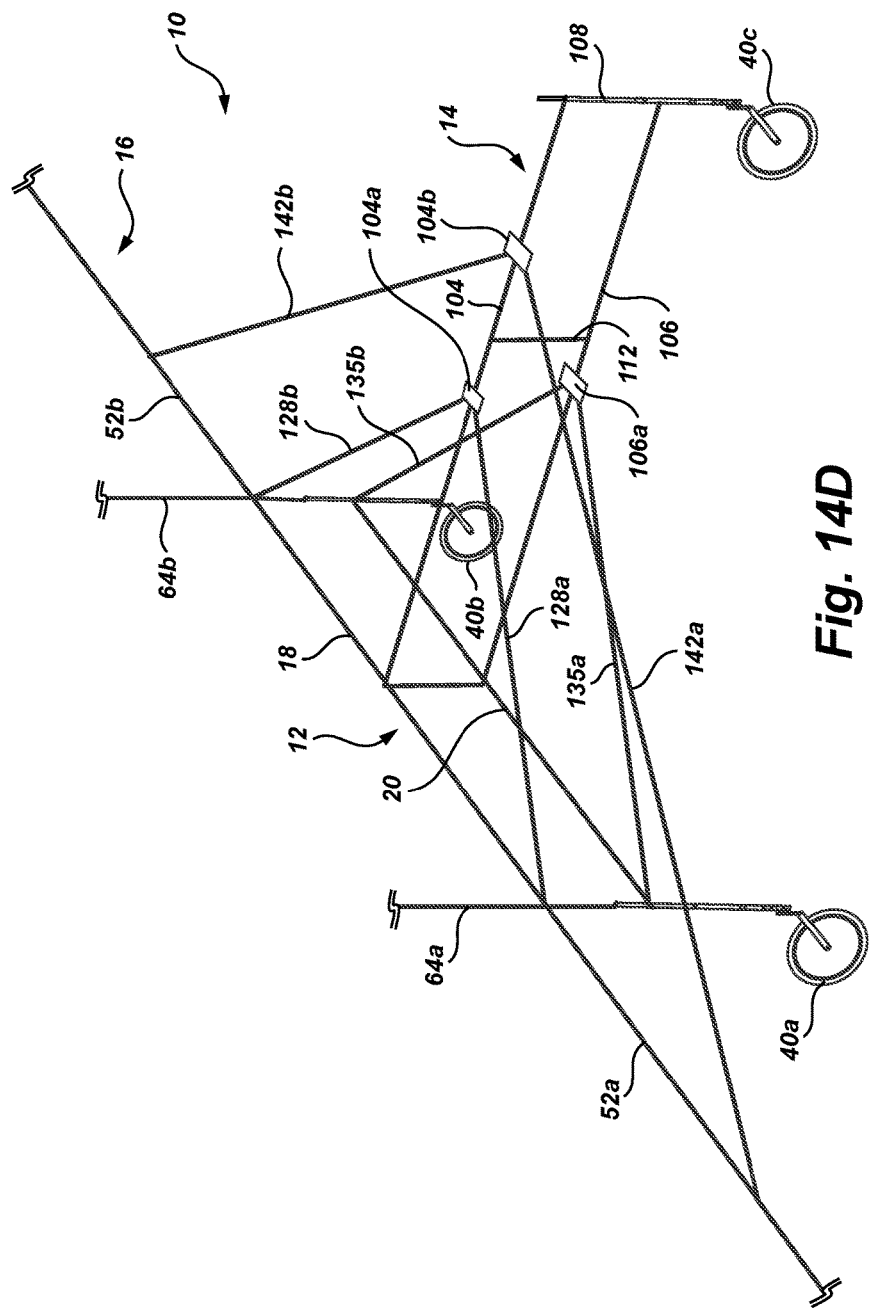
FIG. 14D shows a perspective view of one embodiment of aspects of an irrigation apparatus configured with various struts and flat bars.

FIGS. 14A, 14B, 14C and 14D show various embodiments of aspects of various struts which may be configured to aspects of irrigation apparatus 10 by means of at least one flat bar (such as, for example, but not limited to flat bars 104a, 104b and 106a). The at least one flat bar may be one difference between the embodiments illustrated in FIGS. 13A, 13B and 13C and the embodiments illustrated in FIGS. 14A, 14B, 14C and 14D. The at least one flat bar may be configured to various dimensions, in various ways and with various materials. For example, in one or more embodiments, the at least one flat bar (such as, for example, but not limited to flat bars 104a, 104b and 106a) may each be configured from steel flat bars which may each be between about ¼ of an inch to about 25 feet wide (such as, for example, but not limited to about 2 inches or about 4 inches wide) and may each be between about ⅛ of an inch to about 6 inches thick (such as, for example, but not limited to about ¼ of an inch thick) and between about 1 inch to about 25 feet in length (such as, for example, but not limited to about 2 inches, about 2 and ¾ inches, or about 6 inches in length). In one or more embodiments, flat bars 104a and 104b may be welded to top side member 104. Although FIGS. 14A and 14D shows flat bars 104a and 104b configured on top side member 104 at specific places on top side member 104, they may be located on various places on top side member 104. In one or more embodiments, as shown in FIG. 14B, flat bar 106a may be welded to bottom side member 106. Although FIGS. 14B and 14D shows flat bar 106a configured at a specific place on bottom side member 106, it may be located on various places on bottom side member 106.

FIG. 14A shows a top view of one embodiment of aspects of struts 128a, 128b, 142a and 142b which may be configured to aspects of irrigation apparatus 10 by means of flat bars 104a and 104b.

Struts 128a and 128b may be configured to top side member 104 via flat bar 104a and to top back member 18. Although not shown in FIG. 14A, struts 128a and 128b may be configured to top side member 104 via flat bat 104a and to top back member 18 in various ways and at various locations which may form various angles. In one or more embodiments, the angles 350, 351, 352 and 353 illustrated in FIG. 14A may be similar and/or different to the embodiments of angles 350, 351, 352 and 353 illustrated in FIG. 13A. The various angles formed may be similar to and/or different than each other. In one or more embodiments, the length and configuration of struts 128a and 128b illustrated in FIG. 14A may be similar and/or different to the embodiments of the length and configuration of struts 128a and 128b illustrated in FIG. 13A. The length of struts 128a and 128b may be similar to and/or different than each other. The length of struts 128a and 128b may vary and may be modified as needed.

Struts 142*a* and 142*b* may be configured to top side member 104 via flat bar 104*b* and to at least one boom arm (such as, for example, but not limited to boom arms 52*a* and 52*b*). Although not shown in FIG. 14A, struts 142*a* and 142*b* may be configured to top side member 104 via flat bat 104*b* and at least one boom arm in various ways and at various locations which may form various angles. In one or more embodiments, the angles 354, 355, 356 and 357 illustrated in FIG. 14A may be similar and/or different to the embodiments of angles 354, 355, 356 and 357 illustrated in FIG. 13A. The various angles formed may be similar to and/or different than each other. In one or more embodiments, the length and configuration of struts 142*a* and 142*b* illustrated in FIG. 14A may be similar and/or different to the embodiments of the length and configuration of struts 142*a* and 142*b* illustrated in FIG. 13A. The length of struts 142*a* and 142*b* may be similar to and/or different than each other. The length of struts 142*a* and 142*b* may vary and may be modified as needed.

FIG. 14B shows a perspective view of one embodiment of aspects of struts 135*a* and 135*b* which may be configured to aspects of irrigation apparatus 10 by means of flat bar 106*a*. Struts 135*a* and 135*b* may be configured to flat bar 106*a* and to bottom back member 20. Although not shown in FIG. 14B, struts 135*a* and 135*b* may be configured to bottom side member 106 and to bottom back member 20 in various ways and at various locations which may form various angles. For example, the angle formed between strut 135*a* and bottom side member 106 may be between about 20 degrees to about 70 degrees; the angle between strut 135*b* and bottom side member 106 may be between about 20 degrees to about 70 degrees; the angle between strut 135*a* and bottom back member 20 may be between about 20 degrees to about 70 degrees; and the angle between strut 135*b* and bottom back member 20 may be between about 20 degrees to about 70 degrees. The various angles formed may be similar to and/or different than each other. In one or more embodiments, the length and configuration of struts 135*a* and 135*b* illustrated in FIG. 14B may be similar and/or different to the embodiments of the length and configuration of struts 135*a* and 135*b* illustrated in FIG. 13B. The length of struts 135*a* and 135*b* may be similar to and/or different than each other. The length of struts 135*a* and 135*b* may vary and may be modified as needed.

FIG. 14C show one embodiment of how a strut (such as, for example, but not limited to strut 128*a*) may be configured to a flat bar (such as, for example, but not limited to flat bar 104*a*). As shown in FIG. 14C, holes may be drilled or otherwise configured to strut 128*a* and flat bar 104*a* which may be welded to top side member 104 and when the holes are aligned, a bolt may be inserted through the respective holes and a nut fastened to the bolt to releaseably configure strut 128*a* and flat bar 104*a* together. Although not shown in FIG. 14C, one or more struts may be configured to other aspects of irrigation apparatus 10 (such as, for example, but not limited to top back member 18 and/or boom arms 52*a* and 52*b*) in a similar fashion and/or with the use of different means (such as, for example, but not limited to holes, bolts, nuts, ties, ropes, tape, etc.)

FIG. 14D shows a perspective view of one embodiment of aspects of irrigation apparatus 1 configured with struts 128*a*, 128*b*, 142*a*, 142*b*, 135*a* and 135*b* and flat bars 104*a*, 104*b* and 106*a*. Although not illustrated, aspects of irrigation apparatus 10 may be configured with struts 128*a*, 128*b*, 142*a*, 142*b*, 135*a* and 135*b* and without flat bars 104*a*, 104*b* and 106*a*, such as, for example, but not limited to as illustrated in FIGS. 13A, 13B and 13C.

Although not shown in FIGS. 13A, 13B, 13C, 14A, 14B, 14C and 14D, there may be various other ways to configure at least one means for stabilizing, reinforcing, strengthening and/or counteracting certain forces and/or movements associated with aspects of at least one irrigation apparatus. All such configurations are anticipated by this disclosure.

FIGS. 15, 16A, 16B, 16C, 17A, 17B and 18 show various aspects of at least one means for configuring irrigation apparatus 10 to center pivot irrigation system 120. As indicated above, the at least one means for configuring irrigation apparatus 10 to center pivot irrigation system 120 may be accomplished in various ways and by various means. For example, in one or more embodiments, the at least one means for configuring irrigation apparatus 10 to center pivot irrigation system 120 may include at least one receiver assembly 166, at least one tongue assembly 148 and at least one tow assembly 178. Various aspects of the at least one means for configuring irrigation apparatus 10 to center pivot irrigation system 120 may include various functionality, such as, for example, but not limited to be releaseably or non-releaseably configured together.

Figure 15:
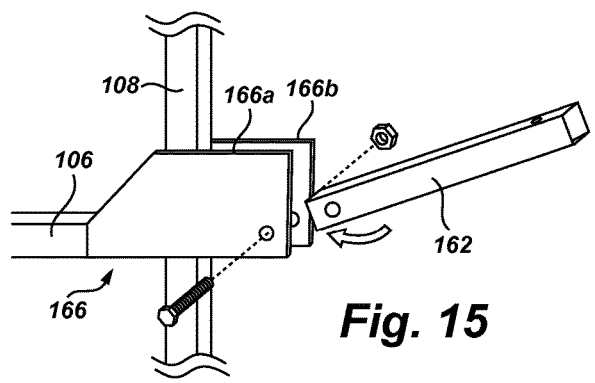
FIG. 15 shows one embodiment of aspects of at least one receiver assembly.

FIG. 15 shows one embodiment of aspects of at least one receiver assembly 166 configured to at least one aspect of at least one side frame 14 and aspects of at least one tongue assembly 148 approaching the at least one receiver assembly 166. In one or more embodiments, receiver assembly 166 may be configured to front leg member 108 and bottom side member 106 in various ways and by various means (such as, for example, but not limited to being welded together). Receiver assembly 166 may include wedge members 166*a* and 166*b*. One wedge member may be configured to one side of front leg member 108 and/or bottom side member 106 and the other wedge member may be configured to the other side of front leg member 108 and/or bottom side member 106 so that a space or an opening may be made sufficiently large enough to allow aspects of tongue assembly 148 (such as, for example, but not limited to first member 162) to fit or slide in between wedge members 166*a* and 166*b*. First member 162 and wedge members 166*a* and 166*b* may each include at least one hole through which a bolt, pin, tie, nuts or other means may pass through to configure first member 162 to the irrigation apparatus 10. Although FIG. 15 (and elsewhere) shows receiver assembly 166 configured to at least one aspect of side frame 14, receiver assembly 166 may be configured to various aspects of irrigation apparatus 10 (such as, for example, but not limited to at least one aspect of back frame 12). Although FIG. 15 (and elsewhere) shows the use of only one receiver assembly 166, multiple receiver assemblies 166 (and multiple tongue assemblies 148 and tow assemblies 178) may be used.

Wedge members 166*a* and 166*b* may be configured to various dimensions, in various ways and with various materials. For example, in one or more embodiments, each wedge member 166*a* and 166*b* may each be between about ¼ of an inch to about 2 feet wide (such as, for example, but not limited to about 6 inches wide) and between about ⅛ of an inch to about 6 inches thick (such as, for example, but not limited to about 3/16 of an inch thick) and between about 1 inch to about 10 feet in length (such as, for example, but not limited to about 11 inches in length).

Figure 16A:
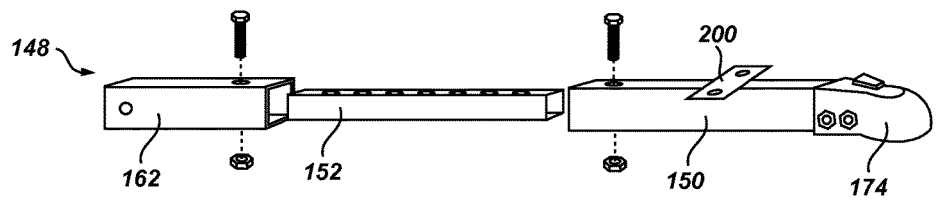
FIG. 16A shows one embodiment of various aspects of at least one tongue assembly separated from each other.

FIG. 16A shows one embodiment of various aspects of at least one tongue assembly 148 separated from each other. In one or more embodiments, tongue assembly 148 may include a first member 162, a telescope member 152 and a hitch member 150.

First member 162 may be configured with a larger circumference or perimeter than telescope member 152 and a hollow center which may be configured to receive, cover and/or surround at least one aspect of telescope member 152 when telescope member 152 may be inserted into first member 162. First member 162 may be configured with holes which may enable it to be releaseably configured to telescope member 152. First member 162 may be configured with holes which may enable it to be releaseably configured to receiver assembly 166. When first member 162 is configured to receiver assembly 166, first member 162 may be lowered and/or raised by pivoting it on the pin or bolt configured through said holes. First member 162 may be configured to various dimensions, in various ways and with various materials. For example, in one or more embodiments, first member 162 may be configured from round, square and/or other shaped steel tubing (such as, for example, but not limited to square steel tubing) which may be between about ¼ of an inch to about 12 inches in width (such as, for example, but not limited to about 2 inches wide) and between about 1 inch to about 40 feet in length (such as, for example, but not limited to about 4 feet long). In one or more embodiments, the thickness of the walls of first member's 162 square steel tubing may be between about 0.001 of an inch to about 6 inches thick (such as, for example, but not limited to 0.083 of an inch thick).

Figure 16B:
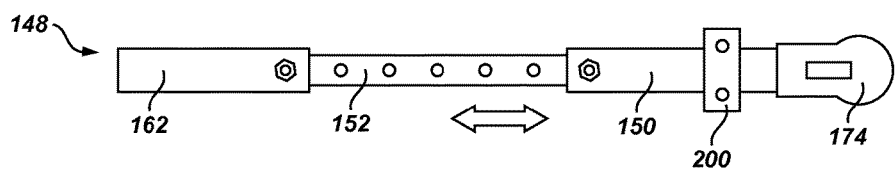
FIG. 16B shows one embodiment of various aspects of at least one tongue assembly configured together.
Figure 16C:
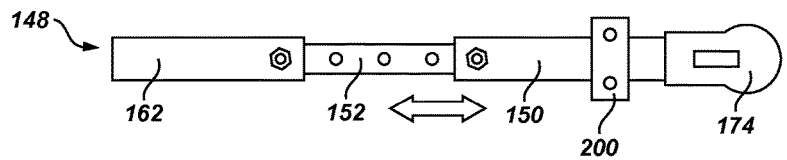
FIG. 16C shows one embodiment of various aspects of at least one tongue assembly configured together.

Telescope member 152 may be configured with a smaller circumference or perimeter than first member 162 and/or hitch member 150 so that at least one aspect of telescope member 152 may be received, covered and/or surrounded into first member 162 and/or hitch member 150. Telescope member 152 may be configured to various dimensions, in various ways and with various materials. For example, in one or more embodiments, telescope member 152 may be configured from round, square and/or other shaped steel tubing (such as, for example, but not limited to square steel tubing) which may be between about ¼ of an inch to about 12 inches in width (such as, for example, but not limited to about 1 and ¾ inches wide) and between about 1 inch to about 40 feet in length (such as, for example, but not limited to about 12 feet long). In one or more embodiments, the thickness of the walls of telescope member's 152 square steel tubing may be between about 0.001 of an inch to about 6 inches thick (such as, for example, but not limited to 0.083 of an inch thick). Telescope member 152 may be configured with holes which may enable it to be configured to first member 162 and/or hitch member 150. As shown in FIGS. 16B and 16C, when telescope member 152 is inserted into first member 162 and/or hitch member 150 and the holes in telescope member 152, first member 162 and/or hitch member 150 are properly aligned, pins, bolts, nuts or other means may releaseably configure telescope member 152 and first member 162 together and/or telescope member 152 and hitch member 150 together. Telescope member 152 may be configured with multiple holes (such as, for example, but not limited to two, three, four, five, six, seven, eight, nine, ten, eleven, twelve or more holes) which may enable an operator to expand and/or contract the length of the tongue assembly 148. Tongue assembly 148 may be expanded and/or contracted by removing the applicable pins, bots, nuts or other means, sliding the hitch assembly 150 up or down the telescope member 152 to a desired position and replacing or inserting the pins, bolts, nuts or other means through the applicable holes to releaseably configure telescope member 152 to hitch assembly 150. In one or more embodiments, telescope member 152 may be configured with six holes spaced about 2 feet apart. The length of the tongue assembly 148 may be repeatedly adjusted to various lengths. In one or more embodiments, irrigation apparatus 10 may be configured so that water may be distributed more than 3 feet behind the at least one support tower. The length of the tongue assembly 148 may be adjusted for at least the purpose of locating irrigation apparatus 10, and consequently the distribution of water by irrigation apparatus 10, far enough behind at least one support tower (such as, for example, but not limited to support tower 307) so as to reduce the amount of water that the at least one support tower 307 may travel over and thereby reduce and/or eliminate rut formation.

Hitch member 150 may include at least one means for configuring it to telescope member 152 as indicated above and illustrated in FIGS. 16A, 16B and 16C. Hitch member 150 may include at least one means for configuring it to the tow assembly 178. For example, in one or more embodiments, hitch member 150 may include a hitch unit 174. Hitch unit 174 may be releaseably configured to hitch member 105 in various ways and by various means, such as, for example, but not limited to the combination of pins, bolts, nuts, holes or other means. Hitch unit 174 may be releaseably configured to a ball unit 176 which may be configured to tow assembly 178 (see FIGS. 17A, 17B and 18). The hitch unit 174 to ball unit 176 configuration may include various unit sizes and be capable of various weight bearing capacities. Hitch member 150 may be configured to various dimensions, in various ways and with various materials. For example, in one or more embodiments, hitch member 150 may be configured from round, square and/or other shaped steel tubing (such as, for example, but not limited to square steel tubing) which may be between about ¼ of an inch to about 12 inches in width (such as, for example, but not limited to about 2 inches wide) and between about 1 inch to about 40 feet in length (such as, for example, but not limited to about 12 feet long). In one or more embodiments, the thickness of the walls of hitch member's 150 square steel tubing may be between about 0.001 of an inch to about 6 inches thick (such as, for example, but not limited to 0.083 of an inch thick). Hitch member 150 may include a flat bar 200. Flat bar 200 may be configured with two holes for purposes discussed below. Flat bar 200 may be configured to various dimensions, in various ways and with various materials. For example, in one or more embodiments, flat bar 200 may be configured from steel flat bar which may be between about ¼ of an inch to about 2 feet wide (such as, for example, but not limited to about 2 inches wide) and between about ⅛ of an inch to about 6 inches thick (such as, for example, but not limited to about ¼ of an inch thick) and between about 1 inch to about 10 feet in length (such as, for example, but not limited to about 6 inches in length) and may be welded to hitch member 150.

FIG. 16B shows one embodiment of various aspects of at least one tongue assembly 148 configured together.

FIG. 16C shows one embodiment of various aspects of at least one tongue assembly 148 configured together, albeit in a more contracted configuration as compared to the embodiment illustrated in FIG. 16B.

Figure 17A:
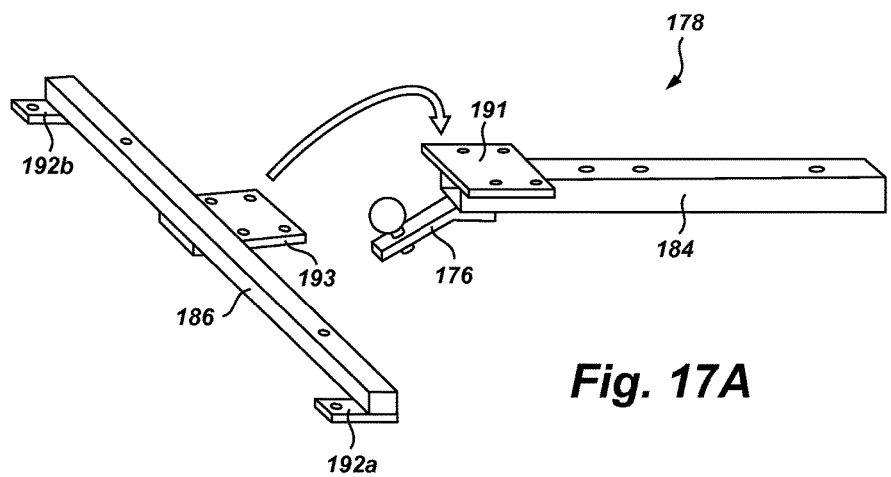
FIG. 17A shows embodiments of aspects of a ball member and aspects of a cross member.
Figure 17B:
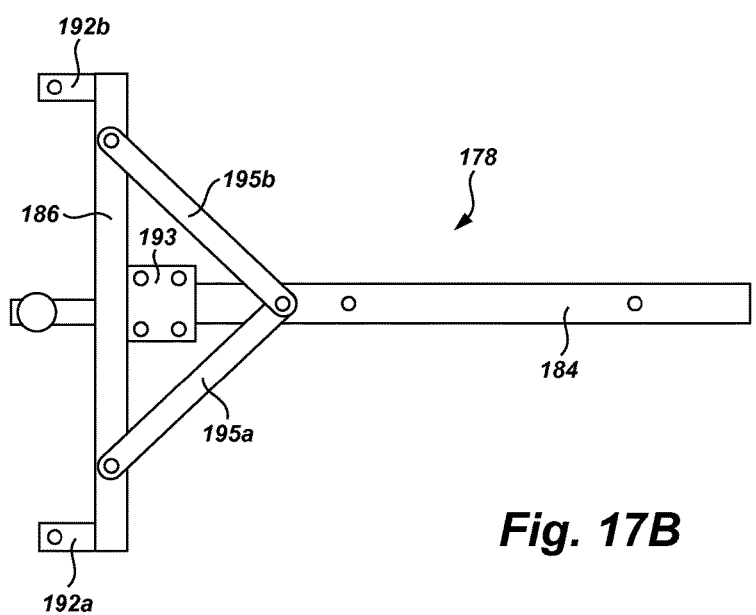
FIG. 17B shows one embodiment of aspects of at least one tow assembly.

FIGS. 17A and 17B show various embodiments of at least one tow assembly 178. Tow assembly 178 may include at least one ball member (such as, for example, but not limited to ball member 184), at least one cross member (such as, for example, but not limited to cross member 186) and/or at least one means for stabilizing, reinforcing, strengthening and/or counteracting certain forces and/or movements associated with aspects of tow assembly 178.

FIG. 17A shows embodiments of aspects of ball member 184 and aspects of cross member 186.

Ball member 184 may be configured to various dimensions, in various ways and with various materials. For example, in one or more embodiments, ball member 184 may be configured from round, square and/or other shaped steel tubing (such as, for example, but not limited to square steel tubing) which may be between about ¼ of an inch to about 12 inches in width (such as, for example, but not limited to about 2 inches wide) and between about 1 inch to about 20 feet in length (such as, for example, but not limited to about 12 feet long). In one or more embodiments, the thickness of the walls of ball member's 184 square steel tubing may be between about 0.001 of an inch to about 6 inches thick (such as, for example, but not limited to 0.083 of an inch thick).

Ball member 184 may include a ball unit 176 which may include a plate welded to ball member 184 upon which a ball may be configured. The plate may be configured to various dimensions, in various ways and with various materials. The ball may be configured to a hitch, such as, for example, but not limited to hitch unit 174. As indicated above, the unit size and weight bearing capacity of ball unit 176 and hitch unit 174 may vary. For example, in one or more embodiments, ball unity 176 may include 1 and ⅞ inch unit.

As illustrated in FIG. 17A, ball member 184 may include a platform 191 whereon aspects of cross member 186 may be configured to. Platform 191 may be configured to various dimensions, in various ways and with various materials. For example, in one or more embodiments, platform 191 may be configured from a steel plate which may be between about ¼ of an inch to about 36 inches in width (such as, for example, but not limited to about 8 inches wide), between about ¼ of an inch to about 36 feet in length (such as, for example, but not limited to about 8 inches long), and between about 0.001 of an inch to about 6 inches thick (such as, for example, but not limited to ¼ of an inch thick).

Ball member 184 may be configured to at least one support tower (such as, for example, but not limited to support tower 307) in various ways and by various means. More will be discussed regarding said means in reference to FIG. 18 below.

Cross member 186 may be configured to various dimensions, in various ways and with various materials. For example, in one or more embodiments, cross member 186 may be configured from round, square and/or other shaped steel tubing (such as, for example, but not limited to square steel tubing) which may be between about ¼ of an inch to about 12 inches in width (such as, for example, but not limited to about 1 and ½ inch or about 2 inches wide) and between about 1 inch to about 20 feet in length (such as, for example, but not limited to about 6 feet or about 8 feet long). In one or more embodiments, the thickness of the walls of cross member's 186 square steel tubing may be between about 0.001 of an inch to about 6 inches thick (such as, for example, but not limited to 0.083 of an inch thick).

Cross member 186 may include at least one means for influencing the movement of irrigation apparatus 10. For example, in one or more embodiments, cross member 186 may include flat bars 192a and 192b which may be welded to cross member 186. Flat bars 192a and 192b may be configured to various dimensions, in various ways and with various materials. For example, in one or more embodiments, flat bars 192a and 192b may each be configured from steel flat bars which may each be between about ¼ of an inch to about 25 feet wide (such as, for example, but not limited to about 2 inches wide) and may each be between about ⅛ of an inch to about 6 inches thick (such as, for example, but not limited to about ¼ of an inch thick) and between about ¼ of inch to about 25 feet in length (such as, for example, but not limited to about 6 inches in length). In one or more embodiments, flat bars 192a and 192b may be welded to cross member 186. More will be discussed regarding cross member's 186 at least one means for influencing the movement of irrigation apparatus 10 with reference to FIG. 18 below.

Cross member 186 may include at least one means for being configured to ball member 184. For example, in one or more embodiments, cross member 186 may be welded to ball member 184. Alternatively and/or in addition, cross member 186 may include a platform 193. Platform 193 may be releaseably configured to platform 191 via pins, bolts, nuts, holes or other means. For example, platform 193 and platform 191 may each be configured with 4 holes which, when properly aligned, 4 bolts may be configured through said holes to 4 nuts to releaseably configured platform 193 to platform 191. Platform 193 may be configured to various dimensions, in various ways and with various materials. For example, in one or more embodiments, platform 193 may be configured from a steel plate which may be between about ¼ of an inch to about 36 inches in width (such as, for example, but not limited to about 8 inches wide), between about ¼ of an inch to about 36 feet in length (such as, for example, but not limited to about 8 inches long), and between about 0.001 of an inch to about 6 inches thick (such as, for example, but not limited to ¼ of an inch thick). The dimensions of the platform 191 may be similar and/or different to platform 193.

FIG. 17B shows one embodiment of aspects of at least one tow assembly 178. Tow assembly 178 may include at least one means for stabilizing, reinforcing, strengthening and/or counteracting certain forces and/or movements associated with aspects of tow assembly 178. For example, in one or more embodiments, tow assembly 178 may include struts 195a and 195b.

Struts 195a and 195b may be configured to various dimensions, in various ways and with various materials. For example, in one or more embodiments, struts 195a and 195b may each be from round, square and/or other shaped steel tubing (such as, for example, but not limited to round steel tubing) and each may between about ⅛ of an inch to about 6 inches wide (such as, for example, but not limited to about 1 inch, about 1 and ½ inch, about 1 and ¾ inch, and/or about 2 inches wide) and between about 0.001 of an inch to about 6 inches thick (such as, for example, but not limited to about 0.083 of an inch thick). Aspects of round steel tubing may be flattened (such as, for example, but not limited to the ends of the struts). The struts may be galvanized electrical conduit and/or electrical metal tubing (EMT). Each strut may be configured from the same and/or different materials and to the same and/or different dimensions.

Struts 195a and 195b may be configured to cross member 186 and ball member 184 in various ways and by various means. For example, cross member 186 may be releaseably configured to ball member 184 via pins, bolts, nuts, holes or other means. Although not shown in FIG. 17B, struts 195a and 195b may be configured to cross member 186 and ball member 184 in various ways and at various locations which may form various angles. For example, the angle between strut 195a and cross member 186 may be between about 20 degrees to about 70 degrees; the angle between strut 195b and cross member 186 may be between about 20 degrees to about 70 degrees; the angle between strut 195a and ball member 184 may be between about 20 degrees to about 70 degrees; and the angle between strut 195*b* and ball member 184 may be between about 20 degrees to about 70 degrees. The various angles formed may be similar to and/or different than each other. Struts 195*a* and 195*b* may each be between about 6 inches to about 10 feet in length. The length of struts 195*a* and 195*b* may be similar to and/or different than each other. The length of struts 195*a* and 195*b* may vary and may be modified as needed.

Figure 18:
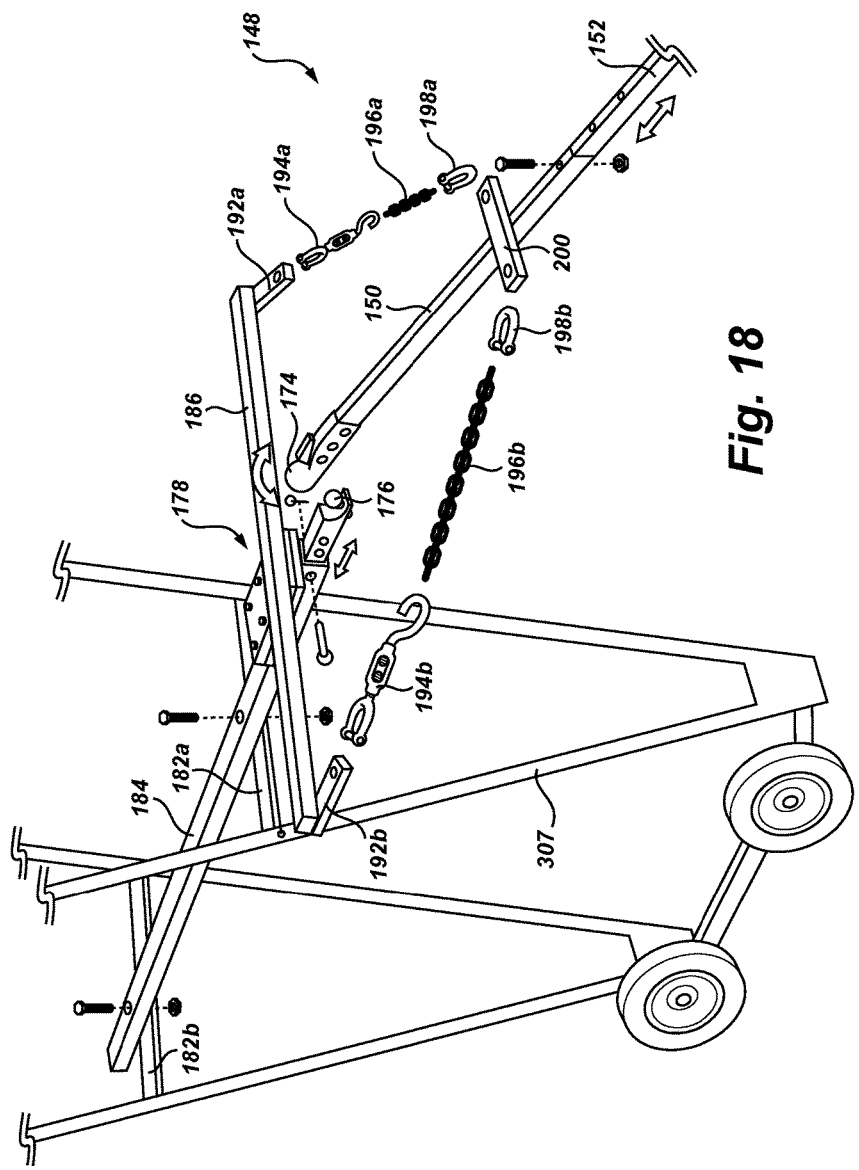
FIG. 18 shows aspects of one embodiment of a support tower, aspects of at least one tow assembly and aspects of at least one tongue assemble.

FIG. 18 shows aspects of one embodiment of a support tower, aspects of at least one tow assembly 178 and aspects of at least one tongue assembly 148. Although not shown in FIG. 18, tow assembly 178 may include struts 195*a* and 195*b* or other at least one means for stabilizing, reinforcing, strengthening and/or counteracting certain forces and/or movements associated with aspects of tow assembly 178.

As indicated above, ball member 184 may be configured to at least one support tower (such as, for example, but not limited to support tower 307) in various ways and by various means. For example, in one or more embodiments, the at least one support tower may include at least one cross bar (such as, for example, but not limited to cross bars 182*a* and 182*b*). As shown in FIG. 18, holes may be configured to at least one cross bar and ball member 184 and when properly aligned, pins, bolts, nuts or other means may be used to configure the ball member 184 and at least one cross bar together. If the at least one support tower has more than one cross bar, ball member 184 may be configured long enough to be configured to multiple cross bars (such as, for example, but not limited to cross bars 182*a* and 182*b*).

As indicated above, cross member 186 may include at least one means for influencing the movement of irrigation apparatus 10. Such means may vary and may include, for example, but not limited to clevises, carabiners, cables, ropes, tape, bungee cords, chains, straps, ties, turnbuckles, flat bars, tubing, struts, holes, nuts, bolts, eye bolts, welding and the like and other means and/or combinations thereof. As shown in FIG. 18, flat bars 192*a* and 192*b* may be respectively configured to turnbuckles 194*a* and 194*b*, which may be respectively configured to chains 196*a* and 196*b*, which may be respectively configured to clevises 198*a* and 198*b*, which may be respectively configured to flat bar 200, which may be configured to hitch member 150, which may be configured to telescope member 152, which may be configured to receiver member 162 (not shown in FIG. 18), which may be configured to receiver assembly 166 (not shown in FIG. 18), which may be configured to front leg member 108 and/or bottom side member 106 (not shown in FIG. 18). An operator may adjust turnbuckles 194*a* and 194*b* to a desired tension in order to control the movement of irrigation apparatus 10 while it is being towed and/or pushed by the center pivot irrigation system 120 or while it is at rest. Such configuration may prevent irrigation apparatus 10 from substantially deviating from the desired spray pattern and water distribution and/or from jack-knifing when being pushed backwards by center pivot irrigation system 120.

Although not shown in FIGS. 15, 16A, 16B, 16C, 17A, 17B and 18 there may be various other ways to configure at least one means for configuring irrigation apparatus 10 to center pivot irrigation system 120. All such configurations are anticipated by this disclosure.

Figure 19A:
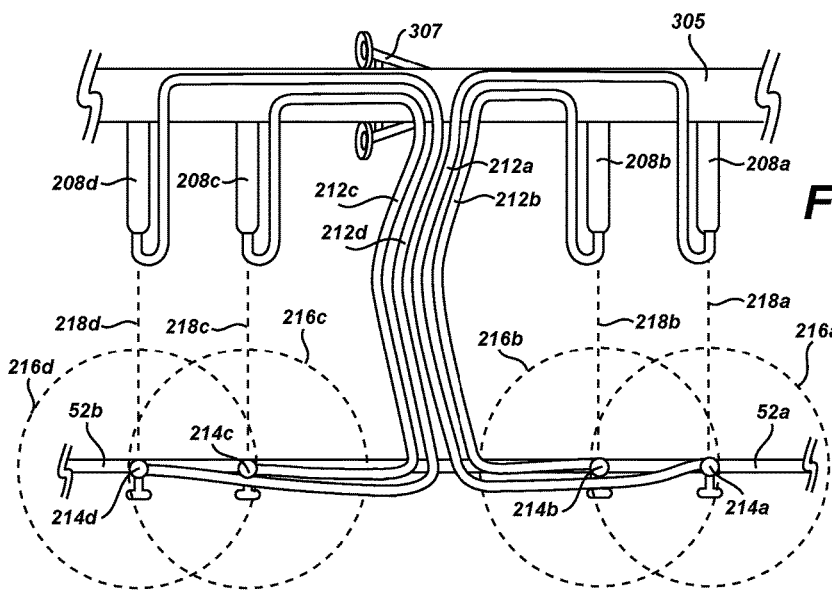
FIG. 19A shows one embodiment of aspects of at least one means for an irrigation apparatus to receive water from a center pivot irrigation system.
Figure 19B:
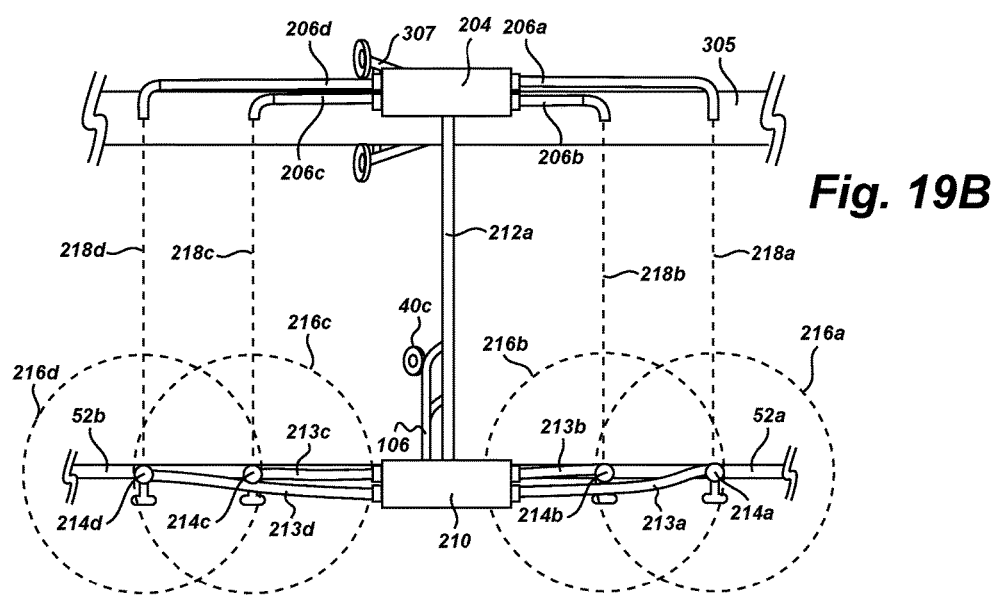
FIG. 19B shows another embodiment of aspects of at least one means for an irrigation apparatus to receive water from a center pivot irrigation system.

FIGS. 19A and 19B show aspects of at least one means for irrigation apparatus 10 to receive water from center pivot irrigation system 120 for distribution onto soils and crops. The means by which irrigation apparatus 10 may be configured for receiving water from center pivot irrigation system 120 may be accomplished in various ways and by various means, such as, for example, but not limited to, hoses, piping, clamps, fittings, valves, barbs, bushings, ties, nozzles and/or other means. Center pivot irrigation system 120 may provide water pressure to force water through the at least one means for irrigation apparatus 10 to receive water from center pivot irrigation system 120 and the at least one means for distributing the water received onto soils and crops. Irrigation apparatus 10 may be configured to distribute water onto soils and crops in various ways and by various means (including, but not limited to, surface and localized irrigations systems such as, for example, but not limited to sprinkler and/or drip irrigations systems).

FIG. 19A shows one embodiment of aspects of at least one means for irrigation apparatus 10 to receive water from center pivot irrigation system 120 for distribution onto soils and crops. In one or more embodiments, center pivot irrigation system 120 and irrigation apparatus 10 may be configured with at least one water line (such as, for example, but not limited to water lines 212*a*, 212*b*, 212*c* and 212*d*). Water lines (such as, for example, but not limited to water lines 212*a*, 212*b*, 212*c* and 212*d*) may be configured to various dimensions, in various ways and with various materials. For example, in one or more embodiments, water lines may each be configured from water hoses, pivot hose, flexible hose or other means which each may between about ⅛ of an inch to about 6 inches diameter (such as, for example, but not limited to about ¾ inch or about 1 inch or about 1 and ½ inch in diameter) and between about 5 feet to about 350 feet in length. The type of material used and its length, diameter and other dimensions may be modified as needed. The water lines may be configured to various aspects of the center pivot irrigation system and/or irrigation apparatus 10 via zip ties, Velcro, welding, rope, bungee cords, chains, bungee cords, tape or other means.

At least one water line may be configured to the center pivot irrigation system 120 in various ways and by various means. For example, in one or more embodiments, center pivot irrigation system 120 may include at least one pivot sprinkler assembly (such as, for example, but not limited to pivot sprinkler assemblies 208*a*, 208*b*, 208*c* and 208*d*). Pivot sprinkler assemblies may include various parts and materials, such as, for example, but not limited to drop hoses, spray nozzles, valves, piping and the like and other sprinkler related devices. Although aspects of the pivot sprinkler assemblies 208*a*, 208*b*, 208*c* and 208*d* illustrated in FIG. 19A are shown as drop hoses, pivot sprinkler assemblies 208*a*, 208*b*, 208*c* and 208*d* may be configured in any configuration that sprinklers and related parts and materials may be configured and used in conjunction with center pivot irrigation systems.

Each water line may be configured to at least one pivot sprinkler assembly in various ways and by various means. For example, in one or more embodiments, water line 212*a* may be configured to pivot sprinkler assembly 208*a*, water line 212*b* may be configured to pivot sprinkler assembly 208*b*, water line 212*c* may be configured to pivot sprinkler assembly 208*c*, and water line 212*d* may be configured to pivot sprinkler assembly 208*d*. Such configuration may be accomplished by removing the spray nozzles configured to each drop hose (or other type of sprinkler assemblies) associated with each pivot sprinkler assembly and attaching the water lines directly to the drop hoses.

Each water line may be routed from a pivot sprinkler assembly to at least one apparatus sprinkler assembly (such as, for example, but not limited to apparatus sprinkler assemblies 214*a*, 214*b*, 214*c* and 214*d*) which may be configured to at least one boom arm (such as, for example, but not limited to boom arms 52*a* and 52*b*) located on irrigation apparatus 10. For example, in one or more embodiments, water line 212a may be configured to apparatus sprinkler assembly 214a which may be configured to boom arm 52a, water line 212b may be configured to apparatus sprinkler assembly 214b which may be configured to boom arm 52a, water line 212c may be configured to apparatus sprinkler assembly 214c which may be configured to boom arm 52b, and water line 212d may be configured to apparatus sprinkler assembly 214d which may be configured to boom arm 52b. Such configuration may channel water from each pivot sprinkler assembly and funnel it to a particular apparatus sprinkler assembly located on irrigation apparatus 10 for distribution onto soils and crops. Such configuration may reduce and/or eliminate rut formation by rerouting and spraying water sufficiently far enough behind the support towers so that they do not travel over wet ground while maintaining substantially similar spray patterns.

Each apparatus sprinkler assembly may have a spray pattern. For example, in one or more embodiments, apparatus sprinkler assembly 214a may have spray pattern 216a, apparatus sprinkler assembly 214b may have spray pattern 216b, apparatus sprinkler assembly 214c may have spray pattern 216c and apparatus sprinkler assembly 214d may have spray pattern 216d. Each spray pattern may be configured to disperse water in a substantially similar spray pattern as may be intended without the use of irrigation apparatus 10. Such may be accomplished by removing each of the spray nozzles located on the pivot sprinkler assemblies and/or other aspects of the center pivot irrigation system 120 and placing them onto the apparatus sprinkler assemblies and/or other aspects of irrigation apparatus 10.

Each apparatus sprinkler assembly may be configured to disperse water in substantially the same location on soils and crops as may be intended without the use of irrigation apparatus 10. For example, as shown in FIG. 19A, apparatus sprinkler assembly 214a may be configured to position 218a, apparatus sprinkler assembly 214b may be configured to position 218b, apparatus sprinkler assembly 214c may be configured to position 218c and apparatus sprinkler assembly 214d may be configured to position 218d. In one or more embodiments, if pivot sprinkler assemblies were configured to be about 5 feet above the soils and/or crops at a particular time, apparatus sprinkler assemblies may be configure to the same, substantially similar and/or different height above the soils and/or crops.

In one or more embodiments, the at least one apparatus sprinkler assembly (such as but not limited to apparatus sprinkler assemblies 214a, 214b, 214c and 214d) may be configured (including but not limited to positioning) as, substantially similar to, different and/or better than the configuration (including but not limited to positioning) of the at least one pivot sprinkler assembly (such as, for example, but not limited to pivot sprinkler assemblies 208a, 208b, 208c and 208d). Such configuration (including but not limited to positioning) may result in the irrigation apparatus 10 producing the same, substantially similar, different and/or better crop coefficients, spray patterns, watering rates, and/or watering quantity as compared to what was achievable by the center pivot irrigation system 120 without the disclosure.

In one or more embodiments, the configuration of apparatus sprinkler assemblies may distribute water onto soil 28 and/or corps in substantially the same way and amount of water as may be intended to be distributed without the use of irrigation apparatus 10. More will be discussed regarding apparatus sprinkler assemblies in reference to FIG. 20 below.

Alternatively and/or in addition, although not shown in FIG. 19A, one or more of the pivot sprinkler assemblies (such as, for example, but not limited to pivot sprinkler assemblies 208a, 208b, 208c and 208d) may be removed from the center pivot irrigation system 120 and instead of the water lines (such as, for example, but not limited to water lines 212a, 212b, 212c and 212d) being configured to aspects of the pivot sprinkler assemblies (e.g. drop hoses), they may be configured to the water outlets which may be on top of the suspended pipeline (such as, for example, but not limited to suspended pipeline 305) and routed to the apparatus sprinkler assemblies (such as, for example, but not limited to apparatus sprinkler assemblies 214a, 214b, 214c and 214d).

FIG. 19B shows one embodiment of aspects of at least one means for irrigation apparatus 10 to receive water from center pivot irrigation system 120 for distribution onto soils and crops. The at least one means for irrigation apparatus 10 to receive water from center pivot irrigation system 120 may include at least one intake line (such as, for example, but not limited to intake lines 206a, 206b, 206c and 206d), at least one pivot manifold (such as, for example, but not limited to pivot manifold 204), at least one water line (such as, for example, but not limited to water line 212a), at least one apparatus manifold (such as, for example, but not limited to apparatus manifold 210), at least one output line (such as, for example, but not limited to output lines 213a, 213b, 213c and 213d), and/or at least one apparatus sprinkler assembly (such as, for example, but not limited to apparatus sprinkler assemblies 214a, 214b, 214c and 214d) which may be configured to the at least one boom arm (such as, for example, but not limited to boom arms 52a and 52b).

The at least one intake line (such as, for example, but not limited to intake lines 206a, 206b, 206c and 206d) may be configured to various dimensions, in various ways and with various materials. For example, in one or more embodiments, intake lines may each be configured from water hoses, pivot hose, flexible hose or other means which each may between about ⅛ of an inch to about 6 inches diameter (such as, for example, but not limited to about ¾ inch in diameter) and between about 6 inches to about 350 feet in length. The type of material used and its length, diameter and other dimensions may be modified as needed. Intake lines may be configured to center pivot irrigation system 120 in various ways and by various means. For example, one or more pivot sprinkler assemblies (such as, for example, but not limited to pivot sprinkler assemblies 208a, 208b, 208c and 208d) may be removed from the water outlets on suspended pipeline 305 and instead, one or more intake lines (such as, for example, but not limited to intake lines 206a, 206b, 206c and 206d) may be configured to the available water outlets. The intake lines may be configured to various aspects of center pivot irrigation system 120 via zip ties, Velcro, welding, rope, chains, bungee cords, tape or other means. Each intake line may be configured to pivot manifold 204 (see FIG. 21) in various ways and by various means. Such configuration may channel water from each water outlet and funnel it to the pivot manifold 204 where it may be transferred (as will be discussed below) to at least one water line and ultimately to at least one apparatus sprinkler assembly located on irrigation apparatus 10 for distribution onto soils and crops. Such configuration may reduce and/or eliminate rut formation by rerouting and spraying water sufficiently far enough behind the support towers so that they do not travel over wet ground while maintaining substantially similar spray patterns.

The at least one pivot manifold (such as, for example, but not limited to pivot manifold 204) may be configured in various ways, to various dimensions and with various materials. Pivot manifolds may be configured to center pivot irrigation systems 120 in various ways, by various means and in various locations on center pivot irrigation systems 120 (such as, for example, but not limited to on to suspended pipeline 305). More will be discussed regarding the at least one pivot manifold in reference to FIG. 21 below. At least one objective of pivot manifolds may be to receive water from one or more intake lines (such as, for example, but not limited to the four intake lines 206a, 206b, 206c and 206d) and channel the water received to one or more water lines (such as, for example, but not limited to water line 212a). At least one objective of pivot manifolds may be to minimize the number of lines or hoses running from the center pivot irrigation system to the irrigation apparatus. For example, pivot manifold 204 may receive water from two or more intake lines (such as, for example, but not limited to intake lines 206a, 206b, 206c and 206d) and channel water out to one or more water lines (such as, for example, but not limited to water lines 212a and/or 212b).

At least one pivot manifold may be configured to at least one apparatus manifold in various ways and by various means. For example, in one or more embodiments, at least one water line (such as, for example, but not limited to water line 212a) may be configured to pivot manifold 204 and apparatus manifold 210 in various ways and by various means (see FIGS. 21 and 22). As stated above, the at least one water line (such as, for example, but not limited to water lines 212a) may be configured to various dimensions, in various ways and with various materials. One difference between the configuration embodiment in FIG. 19B as compared to the configuration embodied in FIG. 19A is that the least one water line (such as, for example, but not limited to water line 212a) represented in FIG. 19B may be shorter in length than the at least one water line (such as, for example, but not limited to water lines 212a, 212b, 212c and 212d) represented in FIG. 19A.

The at least one apparatus manifold (such as, for example, but not limited to pivot manifold 210) may be configured in various ways, to various dimensions and with various materials. Apparatus manifolds may be configured to irrigation apparatus 10 in various ways, by various means and in various locations on irrigation apparatus 10 (such as, for example, but not limited to on to top back member 18). More will be discussed regarding the at least one apparatus manifold in reference to FIG. 22 below. At least one objective of apparatus manifolds may be to receive water from one or more water lines (such as, for example, but not limited to water line 212a) and channel the water received to one or more apparatus sprinkler assemblies (such as, for example, but not limited to apparatus sprinkler assemblies 214a, 214b, 214c and 214d) for distribution onto soils and crops. At least one objective of apparatus manifolds may be to minimize the number of lines or hoses running from the center pivot irrigation system to the irrigation apparatus. For example, apparatus manifold 210 may receive water from one or more water lines (e.g. water line 212a) and channel water out to two or more apparatus sprinkler assemblies (e.g. apparatus sprinkler assemblies 214a, 214b, 214c and 214d).

The at least one output line (such as, for example, but not limited to output lines 213a, 213b, 213c and 213d) may be configured to various dimensions, in various ways and with various materials. For example, in one or more embodiments, output lines may each be configured from water hoses, pivot hose, flexible hose or other means which each may between about ⅛ of an inch to about 6 inches diameter (such as, for example, but not limited to about ¾ inch in diameter) and between about 6 inches to about 350 feet in length. The type of material used and its length, diameter and other dimensions may be modified as needed. Output lines may be configured to apparatus manifold 210 in various ways and by various means (see FIG. 22). Each output line may be configured to irrigation apparatus 10 in various ways and by various means. For example, each output line (such as, for example, but not limited to output lines 213a, 213b, 213c and 213d) may be configured to at least one apparatus sprinkler assembly (such as, for example, but not limited to apparatus sprinkler assemblies 214a, 214b, 214c and 214d) which may be configured to at least one boom arm (such as, for example, but not limited to boom arms 52a and 52b). In one or more embodiments, output line 213a may be configured to apparatus sprinkler assembly 214a which may be configured to boom arm 52a, output line 213b may be configured to apparatus sprinkler assembly 214b which may be configured to boom arm 52a, output line 213c may be configured to apparatus sprinkler assembly 214c which may be configured to boom arm 52b, and output line 213d may be configured to apparatus sprinkler assembly 214d which may be configured to boom arm 52b. Such configuration may channel water from the center pivot irrigation system 120 and funnel it ultimately to the apparatus manifold 210 where it may be transferred through the output lines to at least one apparatus sprinkler assembly located on irrigation apparatus 10 for distribution onto soils and crops. Such configuration may reduce and/or eliminate rut formation by rerouting and spraying water sufficiently far enough behind the support towers so that they do not travel over wet ground while maintaining substantially similar spray patterns. The output lines may be configured to various aspects of irrigation apparatus 10 via zip ties, Velcro, welding, rope, chains, bungee cords, tape or other means.

As stated above with regards to FIG. 19A, each apparatus sprinkler assembly as illustrated in FIG. 19B may have a spray pattern. For example, in one or more embodiments, apparatus sprinkler assembly 214a may have spray pattern 216a, apparatus sprinkler assembly 214b may have spray pattern 216b, apparatus sprinkler assembly 214c may have spray pattern 216c and apparatus sprinkler assembly 214d may have spray pattern 216d. Each spray pattern may be configured to disperse water in a substantially similar spray pattern as may be intended without the use of irrigation apparatus 10. Such may be accomplished by removing each of the spray nozzles located on the pivot sprinkler assemblies and/or other aspects of the center pivot irrigation system 120 and placing them onto the apparatus sprinkler assemblies and/or other aspects of irrigation apparatus 10.

Each apparatus sprinkler assembly may be configured to disperse water in substantially the same location on soils and crops as may be intended without the use of irrigation apparatus 10. For example, as shown in FIG. 19B, apparatus sprinkler assembly 214a may be configured to position 218a, apparatus sprinkler assembly 214b may be configured to position 218b, apparatus sprinkler assembly 214c may be configured to position 218c and apparatus sprinkler assembly 214d may be configured to position 218d. In one or more embodiments, if pivot sprinkler assemblies were configured to be about 5 feet above the soils and/or crops at a particular time, apparatus sprinkler assemblies may be configure to the same, substantially similar and/or different height above the soils and/or crops.

In one or more embodiments, the at least one apparatus sprinkler assembly (such as but not limited to apparatus sprinkler assemblies 214a, 214b, 214c and 214d) may be configured (including but not limited to positioning) as, substantially similar to, different and/or better than the configuration (including but not limited to positioning) of the at least one pivot sprinkler assembly (such as, for example, but not limited to pivot sprinkler assemblies 208a, 208b, 208c and 208d). Such configuration (including but not limited to positioning) may result in the irrigation apparatus 10 producing the same, substantially similar, different and/or better crop coefficients, spray patterns, watering rates, and/ or watering quantity as compared to what was achievable by the center pivot irrigation system 120 without the disclosure.

In one or more embodiments, the configuration of apparatus sprinkler assemblies may distribute water onto soil and/or corps in substantially the same way and amount of water as may be intended to be distributed without the use of irrigation apparatus 10.

Alternatively and/or in addition, although not shown in FIG. 19B, aspects of one or more of the pivot sprinkler assemblies (such as, for example, but not limited to pivot sprinkler assemblies 208a, 208b, 208c and 208d) may not be removed from the center pivot irrigation system 120. Instead of the intake lines (such as, for example, but not limited to intake lines 206a, 206b, 206c and 206d) being configured to available water outlets, the intake lines may be configured to the pivot sprinkler assemblies (such as, for example, but not limited to as shown in reference to the water lines illustrated in FIG. 19A).

Although not shown in FIGS. 19A and 19B, there may be various other ways to channel water from the center pivot irrigation system 120 and funnel it to apparatus sprinkler assemblies located on irrigation apparatus 10 in order to reroute and spray water sufficiently far enough behind the support towers so that they do not travel over wet ground and form or deepen ruts. All such configurations are anticipated by this disclosure.

In one or more embodiments, irrigation apparatus 10 may be configured to distribute water onto soils and crops in front of, under, and/or behind the course in which the at least one support tower travels in such a fashion so as to reduce and/or eliminate rut formation.

In one or more embodiments, irrigation apparatus 10 may be configured to distribute water onto soils and crops in a fashion that is the same, near, substantially similar, and/or better than the water was distributed by center pivot irrigation system 120 without the disclosure.

Figure 20:
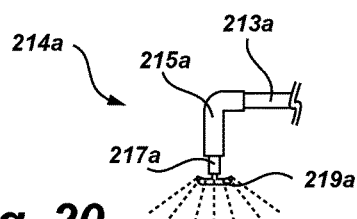
FIG. 20 shows aspects of one embodiment of at least one apparatus sprinkler assembly.

FIG. 20 shows aspects of one embodiment of at least one apparatus sprinkler assembly. Apparatus sprinkler assemblies may include various parts and functionalities, such as, for example, but not limited to hoses, spray nozzles, valves, piping and the like and other sprinkler related devices. In one or more embodiments, each apparatus sprinkler assembly (such as, for example, but not limited to apparatus sprinkler assemblies 214a, 214b, 214c and 214d) may each include at least one hose barb (such as, for example, but not limited to hose 215a), at least one connecting hose (such as, for example, but not limited to connecting hose 217a) and/or at least one nozzle assembly (such as, for example, but not limited to nozzle assembly 219a). Hose barbs may be configured to various dimensions, in various ways and with various materials. For example, in one or more embodiments, hose barbs may each be configured to form between about a 5 degree angle to about a 180 degree angle (such as, for example, but not limited to about a 90 degree angle or elbow) and be capable of being configured to hoses between about a 1/16 of an inch to about 6 inch in diameter (such as, for example, but not limited to about a 3/4 of an inch in diameter). Each apparatus sprinkler assembly may be configured to a boom arm (such as, for example, but not limited to boom arms 52a, 52b, 52c and 52d) in various ways and by various means for distribution of water onto soils and crops.

Figure 21:
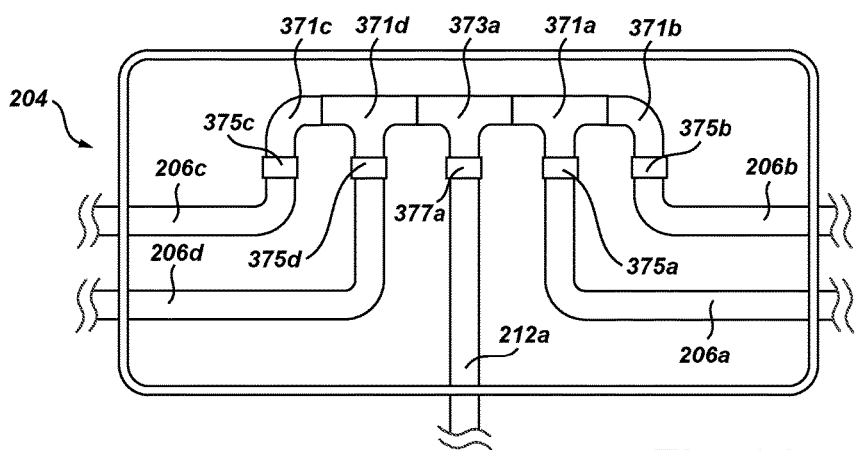
FIG. 21 shows one embodiment of at least one pivot manifold.

FIG. 21 shows one embodiment of at least one pivot manifold 204. As indicated above, pivot manifolds (such as, for example, but not limited to pivot manifold 204) may be configured in various ways, to various dimensions and with various materials (such as, for example, but not limited to PVC piping, bards, hoses, values, adhesives, etc.). FIG. 21 shows one embodiment of pivot manifold 204 which may include various intake valves, hose barbs, and at least one output valve. For example, in one or more embodiments, intake line 206a may be configured to intake valve 371a via hose barb 375a, intake line 206b may be configured to intake valve 371b via hose barb 375b, intake line 206c may be configured to intake valve 371c via hose barb 375c, intake line 206d may be configured to intake valve 371d via hose barb 375d, and water line 212a may be configured to output valve 373a via hose barb 377a. Intake valves 371a, 371b, 371c and 371d may be configured together and funnel water to output valve 373a which may channel water to water line 212a. Pivot water manifold 204 may be capable of receiving water from at least one intake line which may capture and redirect water that was, prior to installing pivot water manifold 204 and at least one intake line directed to at least one pivot sprinkler.

Figure 22:
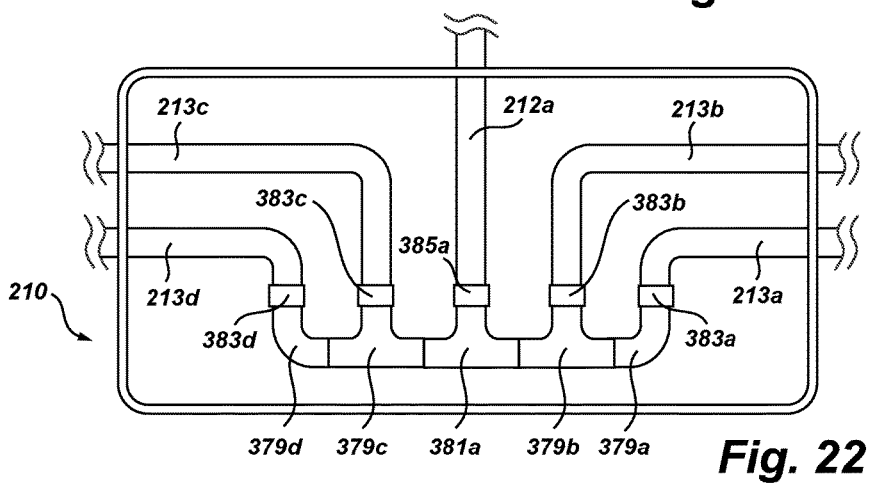
FIG. 22 shows one embodiment of at least one apparatus manifold.

FIG. 22 shows one embodiment of at least one apparatus manifold 210. As indicated above, apparatus manifolds (such as, for example, but not limited to apparatus manifold 210) may be configured in various ways, to various dimensions and with various materials (such as, for example, but not limited to PVC piping, bards, hoses, values, adhesives, etc.). FIG. 22 shows one embodiment of apparatus manifold 210 which may include various intake valves, hose barbs, and at least one output valve. For example, output line 213a may be configured to output valve 379a via hose barb 383a, output line 213b may be configured to output valve 379b via hose barb 383b, output line 213c may be configured to output valve 379c via hose barb 383c, output line 213d may be configured to output valve 379d via hose barb 383d, and water line 212a may be configured to intake valve 381a via hose barb 385a. Water line 212a may funnel water to intake valve 381a which may channel water to output valves 379a, 379b, 379c and 379d (which may be configured together) which may transfer water out to apparatus sprinkler assemblies and onto soils and crops.

Although not shown in FIGS. 19A, 19B, 20, 21 and 22 there may be various other ways to configure at least one means for irrigation apparatus 10 to receive water from center pivot irrigation system 120 for distribution onto soils and crops. All such configurations are anticipated by this disclosure.

Figure 23:
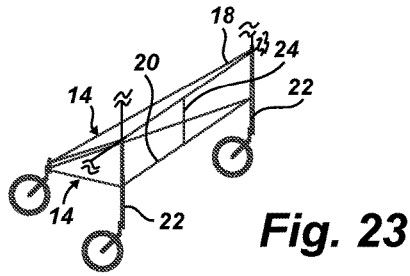
FIG. 23 shows an alternative embodiment of an irrigation apparatus.

FIG. 23 shows an alternative embodiment of irrigation apparatus 10 which may include one back frame 12, two side frames 14 and, although not shown in FIG. 23, said embodiment may include a boom assembly. FIG. 23 shows one embodiment of wheels 40a, 40b and 40c facing in a reverse direction.

An operator may configure the irrigation apparatus as set forth. For example, in one or more embodiments, an operator may configure various aspect of side frame 12 and configure various aspect of back frame 14. An operator may releaseably configure side frame 12 to back frame 14. An operator may configure one or more mobility assemblies. An operator may configure one or more mobility assemblies to aspects of side frame 12 and back frame 14. An operator may configure boom assembly 16 to back frame 14. An operator may configure the at least one means for stabilizing aspects of irrigation apparatus 10 to the irrigation apparatus 10. An operator may configure at least one receiver assembly to aspects of irrigation apparatus 10. An operator may configure at least one means for configuring the apparatus to a center pivot irrigation system 120 to the irrigation apparatus 10 and/or center pivot irrigation system 120. An operator may configure at least one means for receiving water from the center pivot irrigation system 120 to the irrigation apparatus 10 and/or center pivot irrigation system 120. An operator may configure at least one means for distributing the water received from the center pivot irrigation system onto crops to the irrigation apparatus 10. An operator may configure at least one means for enabling the center pivot irrigation system to move the apparatus to the irrigation apparatus 10 and/or center pivot irrigation system 120.

Different embodiments of the disclosure may implement the above scenario(s) and/or variations of the above scenario(s). In one or more embodiment, any of the structures, functions, and/or features of any aspect of the disclosure expressly or inherently described or illustrated herein may be combined with any of the structures, functions, and/or features of any other aspect of the disclosure expressly or inherently described or illustrated herein. In one or more embodiments, each component of the disclosures may be provided in any color.

In one or more embodiments, other modifications may be made to the embodiments illustrated in the drawings or otherwise disclosed herein or equivalents, which may include and/or have the capacity to utilize abilities, systems, devices, articles, means, functionality, features, methods and/or uses not expressly and/or impliedly described herein and/or illustrated in the drawings to this application but which may be obvious to one skilled in the art, whether developed later or known at the time of filing.

It should be understood that the present systems, apparatuses, devices, means, methods and structures are not intended to be limited to the particular forms disclosed; rather, they are to cover all combinations, modifications, equivalents, and alternatives. A system, device, article, means, method or structure that is configured in a certain way may be configured in at least that way, but may also be configured in ways that are not described or illustrated. The disclosure may be configured to function with a variety of systems, devices, articles, methods, means, and structures. Different materials may be used for individual components. Different materials may be combined in a single component.

The present disclosure may be embodied in other specific forms without departing from its spirit or essential characteristics. It is appreciated that various features of the above described examples and embodiments may be mixed and matched to form a variety of other combinations and alternatives. It is also appreciated that devices, methods and systems disclosed herein should not be limited simply to irrigation devices, methods and systems. The described embodiments are to be considered in all respects as illustrative and not restrictive. Other embodiments and/or implementations are within the scope of the following claims and at least all changes which come within the meaning and range of equivalency of the claims are to be embraced within their scope. The scope of the invention may be indicated by the appended claims rather than by any of the foregoing description.

What is claimed is:

1. An irrigation apparatus, comprising:
    a side frame releaseably connected to a back frame;
    a boom assembly comprising: a first boom arm, a second boom arm, a first apparatus sprinkler assembly operably connected to the first boom arm, and a second apparatus sprinkler assembly operably connected to the second boom arm for distributing water onto soil and crops;
    wherein the boom assembly is releaseably connected to the back frame;
    a first strut and a second strut for stabilizing the apparatus;
    wherein the first strut and the second strut are releaseably connected to the back frame and the side frame; and
    a first water line for receiving water from a center pivot irrigation system;
    wherein the first water line is operably connectable to the center pivot irrigation system;
    wherein the center pivot irrigation system comprises: a pump, a pivot, a suspended pipeline, and a support tower;
    wherein the apparatus is designed to be releaseably connectable to the center pivot irrigation system;
    wherein the apparatus is designed to channel the distribution of water behind the support tower in order to at least reduce rut formation while maintaining substantially the same spray pattern and substantially the same water distribution onto the soil and crops that would have occurred without the use of the apparatus; and
    wherein the apparatus is moved by the center pivot irrigation system when the center pivot irrigation system moves around the pivot.

2. The apparatus of claim 1, wherein the side frame comprises:
    a top side member;
    a bottom side member;
    a front leg member; and
    a back side member;
    wherein the top side member and the bottom side member are operably connected to the front leg member and the back side member; and
    wherein the back side member is releaseably connected to the back frame.

3. The apparatus of claim 2, wherein the side frame further comprises:
    a middle side brace member;
    a first side brace member; and
    a second side brace member;
    wherein the middle side brace member, the first side brace member, and the second side brace member are operably connected to the top side member and the bottom side member.

4. The apparatus of claim 3, wherein the first side brace member and the second side brace member are operably connected to the top side member and the bottom side member at angles between about 20 degrees and about 70 degrees.

5. The apparatus of claim 1, wherein the back frame comprises:
    a top back member;
    a bottom back member;
    a first back leg member; and
    a second back leg member;
    wherein the top back member and the bottom back member are operably connected to the first back leg member and the second back leg member.

6. The apparatus of claim 5, wherein the back frame further comprises:
a middle back brace member;
a first back brace member; and
a second back brace member;
wherein the middle back brace member, the first back brace member and the second back brace member are operably connected to the top back member and the bottom back member.

7. The apparatus of claim 6, wherein the first back brace member and the second back brace member are operably connected to the top back member and the bottom back member at angles between about 20 degrees and about 70 degrees.

8. The apparatus of claim 5, wherein the first boom arm is releaseably connected to one end of the top back member and the second boom arm is releaseably connected to an alternative end of the top back member.

9. The apparatus of claim 8, wherein the boom assembly further comprises:
a first vertical post assembly for providing support to the first boom arm and a second vertical post assembly for providing support to the second boom arm; and
wherein the first vertical post assembly is operably connected to the first boom arm and the second vertical post assembly is operably connected to the second boom arm.

10. The apparatus of claim 9,
wherein the first vertical post assembly comprises: a first permanent member and a first detachable member;
wherein the second vertical post assembly comprises: a second permanent member and a second detachable member;
wherein one end of the first permanent member and one end of the second permanent member are operably connected to and extend from the top back member;
wherein an alternative end of the first permanent member is operably connected to the first detachable member; and
wherein an alternative end of the second permanent member is operably connected to the second detachable member.

11. The apparatus of claim 10,
wherein a first cable operably connects the first detachable member to the first boom arm; and
wherein a second cable operably connects the second detachable member to the second boom arm.

12. The apparatus of claim 5, further comprising:
a first mobility assembly and a second mobility assembly;
wherein the first mobility assembly is operably connected to the first back leg member;
wherein the second mobility assembly is operably connected to the second back leg member;
wherein the first mobility assembly comprises a first wheel that is capable of swiveling 360 degrees; and
wherein the second mobility assembly comprises a second wheel that is capable of swiveling 360 degrees.

13. The apparatus of claim 1, further comprising:
a third strut and a fourth strut for stabilizing the apparatus; and
wherein the third strut is releaseably connected to the first boom arm and the side frame; and
wherein the fourth strut is releaseably connected to the second boom arm and the side frame.

14. The apparatus of claim 13, further comprising:
a fifth strut and a sixth strut for stabilizing the apparatus; and
wherein the fifth strut and the sixth strut are releaseably connected to the side frame and the back frame.

15. The apparatus of claim 1,
wherein the apparatus is releaseably connectable to the center pivot irrigation system by a receiver assembly and a tongue assembly;
wherein the receiver assembly is operably connected to the side frame;
wherein the tongue assembly is pivotably connected to the receiver assembly and operably connectable to the center pivot irrigation system; and
wherein the length of the tongue assembly is adjustable in order to ensure that the distribution of water from the apparatus is behind the support tower so as to at least reduce the amount of water that the tower travels over and, thereby, at least reduce rut formation.

16. The apparatus of claim 1, wherein the first water line is operably connected to an apparatus manifold that is designed to channel water to the first apparatus sprinkler assembly and the second apparatus sprinkler assembly.

17. The apparatus of claim 16, further comprising:
a first output line and a second output line operably connected to the apparatus manifold;
wherein the first output line channels water to the first apparatus sprinkler assembly; and
wherein the second output line channels water to the second apparatus sprinkler assembly.

18. The apparatus of claim 1, further comprising:
a second water line operably connectable to the center pivot irrigation system;
wherein the first water line is operably connected to the first apparatus sprinkler assembly; and
wherein the second water line is operably connected to the second apparatus sprinkler assembly.

19. The apparatus of claim 1,
wherein the apparatus is designed to channel the distribution of water behind the support tower in order to at least reduce the amount wet ground the support tower travels over and, thereby, reduce rut formation; and
wherein the apparatus is operably connectable to the support tower of the center pivot irrigation system.

20. An irrigation system, comprising:
a center pivot irrigation system comprising: a pump, a pivot, a suspended pipeline and a support tower for moving the suspended pipeline around the pivot; and
at least one irrigation apparatus, comprising:
a side frame releaseably connected to a back frame;
a boom assembly comprising: a first boom arm, a second boom arm, a first apparatus sprinkler assembly operably connected to the first boom arm, and a second apparatus sprinkler assembly operably connected to the second boom arm for distributing water onto soil and crops;
wherein the boom assembly is releaseably connected to the back frame;
a first strut and a second strut for stabilizing the apparatus;
wherein the first strut and the second strut are releaseably connected to the back frame and the side frame; and
a first water line for receiving water from the center pivot irrigation system;
wherein the first water line is operably connectable to the center pivot irrigation system;
wherein the apparatus is designed to be releaseably connectable to the center pivot irrigation system;

wherein the apparatus is designed to channel the distribution of water behind the support tower in order to at least reduce rut formation while maintaining substantially the same spray pattern and substantially the same water distribution onto the soil and crops that would have occurred without the use of the irrigation apparatus; and wherein the apparatus is moved by the center pivot irrigation system when the center pivot irrigation system moves around the pivot.

* * * * *

UNITED STATES PATENT AND TRADEMARK OFFICE
CERTIFICATE OF CORRECTION

PATENT NO. : 10,264,740 B2  
APPLICATION NO. : 14/960325  
DATED : April 23, 2019  
INVENTOR(S) : Bruce C. Mortensen, Norman Delton Hansen and Ivan Hugh McCracken, II Page 1 of 3

It is certified that error appears in the above-identified patent and that said Letters Patent is hereby corrected as shown below:

In the Specification

Column 1, Line 39, "illuminating" should be --eliminating--.

Column 2, Line 54, "illuminate" should be --eliminate--; and
Column 2, Line 57, "apparatus be to" should be --apparatus to--.

Column 3, Line 66, "show" should be --shows--.

Column 4, Line 18, "assemble" should be --assembly--.

Column 5, Line 6, delete the second instance of "sizes,"; and
Column 5, Line 48, "configured" should be --configure--.

Column 6, Line 29, "and/or shapes" should be --and/or other shapes--;
Column 6, Line 38, "way" should be --ways--; and
Column 6, Line 63, delete "corn,".

Column 7, Line 34, "aspects" should be --aspect--;
Column 7, Line 36, "characteristic" should be --characteristics--;
Column 7, Line 40, "at least strut" should be --at least one strut--; and
Column 7, Line 67, "aspect" should be --aspects--.

Column 8, Line 8, "values" should be --valves--;
Column 8, Line 51, "apparatus 10 the" should be --apparatus 10 as the--; and
Column 8, Line 65, "done is" should be --done in--.

Column 11, Line 18, "wheel 4a" should be --wheel 40a--; and

Signed and Sealed this
Seventeenth Day of November, 2020

Andrei Iancu
*Director of the United States Patent and Trademark Office*

CERTIFICATE OF CORRECTION (continued)
U.S. Pat. No. 10,264,740 B2

Column 11, Lines 20 to 21, "including being able to be pushed and/or pulled the irrigation apparatus 10 in any desirable direction." should be --which may allow irrigation apparatus 10 to be pushed and/or pulled in any desirable direction.--.

Column 12, Line 51, "apparatus 10 may" should be --apparatus 10 which may--; and
Column 12, Line 52, "assembly 30 may" should be --assembly 30, may--.

Column 13, Line 24, "angle 50 by" should be --angle by--; and
Column 13, Lines 28 to 29, "including being able to be pushed and/or pulled the irrigation apparatus 10 in any desirable direction." should be --which may allow irrigation apparatus 10 to be pushed and/or pulled in any desirable direction.--.

Column 14, Line 50, "apparatus 10 may" should be --apparatus 10 which may--;
Column 14, Line 51, "assembly 30 may" should be --assembly 30, may--; and
Column 14, Line 61, "in their rotatability and/or orientably" should be --in their ability to rotate and/or orientate--.

Column 17, Line 37, "have a smaller" should be --have smaller--; and
Column 17, Line 43, "have a larger" should be --have larger--.

Column 22, Line 6, "patterns" should be --pattern--.

Column 24, Line 53, "bat" should be --bar--.

Column 25, Line 5, "bat" should be --bar--; and
Column 25, Line 45, "show" should be --shows--.

Column 27, Line 60, "bots" should be --bolts--.

Column 29, Line 25, "unity" should be --unit--.

Column 30, Line 44, "may between" should be --may be between--.

Column 32, Line 24, "may between" should be --may be between--;
Column 32, Line 25, "inches diameter" should be --inches in diameter--; and
Column 32, Line 33, delete "bungee cords,".

Column 33, Line 43, "configure" should be --configured--; and
Column 33, Line 62, "corps" should be --crops--.

Column 34, Line 39, "may between about 1/8 of an inch to about 6 inches diameter" should be --may be between about 1/8 of an inch to about 6 inches in diameter--.

Column 36, Line 1, "may between about 1/8 of an inch to about 6 inches diameter" should be --may be between about 1/8 of an inch to about 6 inches in diameter--;

Column 36, Line 56, "assembly 214amay" should be --assembly 214a may--; and
Column 36, Line 63, "configure" should be --configured--.

Column 37, Line 15, "corps" should be --crops--.

Column 38, Line 11, "values" should be --valves--; and
Column 38, Line 34, "values" should be --valves--.